(12) United States Patent
Yang et al.

(10) Patent No.: US 12,019,219 B2
(45) Date of Patent: Jun. 25, 2024

(54) OPTICAL IMAGING LENS ASSEMBLY

(71) Applicant: ZHEJIANG SUNNY OPTICS CO.,LTD., Zhejiang (CN)

(72) Inventors: Meng Yang, Zhejiang (CN); Fujian Dai, Zhejiang (CN); Liefeng Zhao, Zhejiang (CN)

(73) Assignee: ZHEJIANG SUNNY OPTICAL CO., LTD, Zhejiang (CN)

( * ) Notice: Subject to any disclaimer, the term of this patent is extended or adjusted under 35 U.S.C. 154(b) by 514 days.

(21) Appl. No.: 17/329,201

(22) Filed: May 25, 2021

(65) Prior Publication Data
US 2021/0396968 A1 Dec. 23, 2021

(30) Foreign Application Priority Data
Jun. 5, 2020 (CN) .......................... 202010508243.1

(51) Int. Cl.
*G02B 13/00* (2006.01)
(52) U.S. Cl.
CPC ................ *G02B 13/0045* (2013.01)
(58) Field of Classification Search
CPC ................ G02B 13/0045; G02B 13/18; G02B 27/0012; G02B 15/1461
See application file for complete search history.

(56) References Cited

U.S. PATENT DOCUMENTS

| | | |
|---|---|---|
| 2019/0121100 A1 | 4/2019 | Song et al. |
| 2021/0278636 A1* | 9/2021 | Lin .......................... G02B 13/04 |
| 2022/0066163 A1* | 3/2022 | Yu ........................... G02B 13/06 |
| 2022/0075149 A1* | 3/2022 | Chen ....................... G02B 13/18 |
| 2022/0082795 A1* | 3/2022 | Wang .................. G02B 13/0045 |
| 2022/0082798 A1* | 3/2022 | Yang ....................... G02B 13/06 |
| 2022/0082800 A1* | 3/2022 | Zhu .......................... G02B 9/64 |
| 2023/0146383 A1* | 5/2023 | Lee .......................... G02B 9/12 |
| | | 359/716 |

FOREIGN PATENT DOCUMENTS

CN 206946080 U 1/2018

* cited by examiner

*Primary Examiner* — Marin Pichler
*Assistant Examiner* — K Muhammad
(74) *Attorney, Agent, or Firm* — Samson G. Yu

(57) ABSTRACT

The disclosure provides an optical imaging lens assembly, which includes nine lenses. From an object side to an image side, the nine lenses are sequentially: a first lens with positive refractive power, a second lens with positive refractive power, of which an object-side surface thereof is a convex surface while an image-side surface is a concave surface, a third lens with refractive power, of which an object-side surface thereof is a convex surface while an image-side surface is a concave surface, a fourth lens with refractive power, a fifth lens with refractive power, a sixth lens with refractive power, a seventh lens with positive refractive power, an eighth lens with refractive power, and a ninth lens with negative refractive power. The nine lenses are independent of one another and have air spaces on an optical axis.

12 Claims, 18 Drawing Sheets

OPTICAL IMAGING LENS ASSEMBLY

CROSS-REFERENCE TO RELATED APPLICATION(S)

The disclosure claims priority to Chinese Patent Application No. 202010508243.1, filed on Jun. 5, 2020 and entitled "Optical imaging lens assembly", the contents of which are hereby incorporated by reference in its entirety.

TECHNICAL FIELD

The disclosure relates to an optical imaging lens assembly, and particularly to an optical imaging lens assembly consisting of nine lenses.

BACKGROUND

With the rapid development of sciences and technologies, camera lenses applicable to portable electronic products have changed quickly, requirements of people on the imaging quality of camera lenses have increased, and ultrathin super-definition mobile phone lenses with ultra-large image surfaces have been increasingly popular. Meanwhile, with the performance improvement of a common Charge Coupled Device (CCD) or Complementary Metal Oxide Semiconductor (CMOS) for an imaging lens of a mobile phone and the reduction of an image element size, a higher requirement is made to the corresponding optical imaging lens assembly. For ensuring a larger design space in the degree of freedom of design of a optical imaging lens assembly meeting a market requirement, the disclosure provides an ultrathin nine-lens optical imaging system with a large image surface and high imaging quality.

SUMMARY

Based on the foregoing problem, some embodiments of the disclosure provide an optical imaging lens assembly with nine lenses. Compared with a optical imaging lens assembly with eight or fewer lenses in a conventional art, the optical imaging lens assembly has the advantages that the image quality may further be improved, and an aberration may be controlled.

The disclosure provides an optical imaging lens assembly, which includes nine lenses, wherein, from an object side to an image side, the nine lenses are sequentially: a first lens with positive refractive power, a second lens with positive refractive power, of which an object-side surface thereof is a convex surface while an image-side surface is a concave surface, a third lens with refractive power, of which an object-side surface thereof is a convex surface while an image-side surface is a concave surface, a fourth lens with refractive power, a fifth lens with refractive power, a sixth lens with refractive power, a seventh lens with positive refractive power, an eighth lens with refractive power, and a ninth lens with negative refractive power, of which an object-side surface thereof is a concave surface while an image-side surface is a concave surface; and the nine lenses are independent of one another and have air spaces on an optical axis.

In an implementation mode of the disclosure, an on-axis distance TTL from an object-side surface of the first lens to an image surface of the optical imaging lens assembly and a maximum half image height ImgH meet $TTL/ImgH \leq 1.25$.

In an implementation mode of the disclosure, the on-axis distance TTL from an object-side surface of the first lens to an image surface of the optical imaging lens assembly and a maximum half image height ImgH meet $4.8 \text{ mm} \leq ImgH^2/TTL \leq 6.0 \text{ mm}$.

In an implementation mode of the disclosure, an effective focal length f1 of the first lens and an effective focal length f of the optical imaging lens assembly meet $1.8 < f1/f < 2.5$.

In an implementation mode of the disclosure, an effective focal length f of the optical imaging lens assembly and an effective focal length f2 of the second lens meet $0 < f/f2 < 0.5$.

In an implementation mode of the disclosure, a maximum field of view (FOV) of the optical imaging lens assembly meets $93° < FOV < 103°$.

In an implementation mode of the disclosure, a curvature radius R15 of an object-side surface of the eighth lens, a curvature radius R16 of an image-side surface of the eighth lens, a curvature radius R13 of an object-side surface of the seventh lens and a curvature radius R14 of an image-side surface of the seventh lens meet $-1.0 < (R15+R16)/(R13+R14) < -0.5$.

In an implementation mode of the disclosure, an effective focal length f5 of the fifth lens, an effective focal length f7 of the seventh lens and an effective focal length f8 of the eighth lens meet $0.7 < f5/(f7+f8) < 1.2$.

In an implementation mode of the disclosure, an effective semi-diameter DT22 of the image-side surface of the second lens and an edge thickness ET9 of the ninth lens meet $0.8 < DT22/ET9 < 1.3$.

In an implementation mode of the disclosure, SAG61 is an on-axis distance from an intersection point of an object-side surface of the sixth lens and the optical axis to an effective radius vertex of the object-side surface of the sixth lens, SAG62 is an on-axis distance from an intersection point of an image-side surface of the sixth lens and the optical axis to an effective radius vertex of the image-side surface of the sixth lens, SAG61 and SAG62 meet $1.4 < SAG61/SAG62 < 2.4$.

In an implementation mode of the disclosure, an air space T67 between the sixth lens and the seventh lens on the optical axis, an air space T78 between the seventh lens and the eighth lens on the optical axis and an air space T89 between the eighth lens and the ninth lens on the optical axis meet $0.9 < (T67+T78)/T89 < 1.4$.

In an implementation mode of the disclosure, an effective focal length f6 of the sixth lens and an effective focal length f9 of the ninth lens meet $2.7 < f6/f9 < 3.2$.

In an implementation mode of the disclosure, a center thickness CT7 of the seventh lens on the optical axis and an edge thickness ET7 of the seventh lens meet $1.5 < CT7/ET7 < 2.5$.

An aspect of the disclosure provides an optical imaging lens assembly. Lenses are independent of one another, and nine lenses with air spaces are included. Relationships between an on-axis distance TTL from an object-side surface of the first lens to an image surface of the optical imaging lens assembly and a maximum half image height ImgH and between an effective focal length f1 of the first lens and an effective focal length of the optical imaging lens assembly are as follows: $TTL/ImgH \leq 1.25$; $4.8 \text{ mm} \leq ImgH^2/TTL \leq 6.0 \text{ mm}$; and $1.8 < f1/f < 2.5$.

In an implementation mode of the disclosure, the effective focal length f of the optical imaging lens assembly, an effective focal length f2 of the second lens and a maximum FOV of the optical imaging lens assembly meet: $0 < f/f2 < 0.5$; and $93° < FOV < 1030$.

In an implementation mode of the disclosure, a curvature radius R15 of an object-side surface of the eighth lens, a curvature radius R16 of an image-side surface of the eighth lens, a curvature radius R13 of an object-side surface of the seventh lens, a curvature radius R14 of an image-side surface of the seventh lens, an effective focal length f5 of the fifth lens, an effective focal length f7 of the seventh lens and an effective focal length f8 of the eighth lens meet:

$-1.0<(R15+R16)/(R13+R14)<-0.5$; and $0.7<f5/(f7+f8)<1.2$.

In an implementation mode of the disclosure, an effective semi-diameter DT22 of an image-side surface of the second lens, an edge thickness ET9 of the ninth lens, an on-axis distance SAG61 from an intersection point of an object-side surface of the sixth lens and an optical axis to an effective radius vertex of the object-side surface of the sixth lens and an on-axis distance SAG62 from an intersection point of an image-side surface of the sixth lens and the optical axis to an effective radius vertex of the image-side surface of the sixth lens meet:

$0.8<DT22/ET9<1.3$; and $1.4<SAG61/SAG62<2.4$.

In an implementation mode of the disclosure, an air space T67 between the sixth lens and the seventh lens on the optical axis, an air space T78 between the seventh lens and the eighth lens on the optical axis, an air space T89 between the eighth lens and the ninth lens on the optical axis, an effective focal length f6 of the sixth lens and an effective focal length f9 of the ninth lens meet:

$0.9<(T67+T78)/T89<1.4$; and $2.7<f6/f9<3.2$.

In an implementation mode of the disclosure, a center thickness CT7 of the seventh lens on the optical axis, an edge thickness ET7 of the seventh lens, a curvature radius R15 of an object-side surface of the eighth lens, a curvature radius R16 of an image-side surface of the eighth lens, a curvature radius R13 of an object-side surface of the seventh lens and a curvature radius R14 of an image-side surface of the seventh lens meet:

$1.5<CT7/ET7<2.5$; and $-1.0<(R15+R16)/(R13+R14)<-0.5$.

An aspect of the disclosure provides an optical imaging lens assembly. Lenses are independent of one another, and nine lenses with air spaces are included. An effective focal length f of the optical imaging lens assembly, an effective focal length f2 of the second lens, a maximum FOV of the optical imaging lens assembly, a curvature radius R15 of an object-side surface of the eighth lens, a curvature radius R16 of an image-side surface of the eighth lens, a curvature radius R13 of an object-side surface of the seventh lens and a curvature radius R14 of an image-side surface of the seventh lens meet:

$0<f/f2<0.5$;

$93°<FOV<103°$; and $-1.0<(R15+R16)/(R13+R14)<-0.5$.

In an implementation mode of the disclosure, an on-axis distance TTL from an object-side surface of the first lens to an image surface of the optical imaging lens assembly, a maximum half image height ImgH, an effective semi-diameter DT22 of an image-side surface of the second lens and an edge thickness ET9 of the ninth lens meet:

$TTL/ImgH \leq 1.25$; and $0.8<DT22/ET9<1.3$.

In an implementation mode of the disclosure, the on-axis distance TTL from the object-side surface of the first lens to an image surface of the optical imaging lens assembly, the maximum half image height ImgH, an on-axis distance SAG61 from an intersection point of an object-side surface of the sixth lens and an optical axis to an effective radius vertex of the object-side surface of the sixth lens and an on-axis distance SAG62 from an intersection point of an image-side surface of the sixth lens and the optical axis to an effective radius vertex of the image-side surface of the sixth lens meet:

$4.8 \text{ mm} \leq ImgH^2/TTL \leq 6.0 \text{ mm}$; and $1.4<SAG61/SAG62<2.4$.

In an implementation mode of the disclosure, an effective focal length f1 of the first lens, the effective focal length f of the optical imaging lens assembly, an air space T67 between the sixth lens and the seventh lens on the optical axis, an air space T78 between the seventh lens and the eighth lens on the optical axis and an air space T89 between the eighth lens and the ninth lens on the optical axis meet:

$1.8<f1/f<2.5$; and $0.9<(T67+T78)/T89<1.4$.

In an implementation mode of the disclosure, an effective focal length f5 of the fifth lens, an effective focal length f7 of the seventh lens, an effective focal length f8 of the eighth lens, an effective focal length f6 of the sixth lens and an effective focal length f9 of the ninth lens meet:

$0.7<f5/(f7+f8)<1.2$; and $2.7<f6/f9<3.2$.

In an implementation mode of the disclosure, an air space T67 between the sixth lens and the seventh lens on the optical axis, an air space T78 between the seventh lens and the eighth lens on the optical axis, an air space T89 between the eighth lens and the ninth lens on the optical axis, a center thickness CT7 of the seventh lens on the optical axis and an edge thickness ET7 of the seventh lens meet:

$0.9<(T67+T78)/T89<1.4$; and $1.5<CT7/ET7<2.5$.

An aspect of the disclosure provides an optical imaging lens assembly. Lenses are independent of one another, and nine lenses with air spaces are included. An effective focal length f5 of the fifth lens, an effective focal length f7 of the seventh lens, an effective focal length f8 of the eighth lens, an effective semi-diameter DT22 of an image-side surface of the second lens, an edge thickness ET9 of the ninth lens, an on-axis distance SAG61 from an intersection point of an object-side surface of the sixth lens and an optical axis to an effective radius vertex of the object-side surface of the sixth lens and an on-axis distance SAG62 from an intersection point of an image-side surface of the sixth lens and the optical axis to an effective radius vertex of the image-side surface of the sixth lens meet:

$0.7<f5/(f7+f8)<1.2$;

$0.8<DT22/ET9<1.3$; and $1.4<SAG61/SAG62<2.4$.

In an implementation mode of the disclosure, an on-axis distance TTL from an object-side surface of the first lens to an image surface of the optical imaging lens assembly, a maximum half image height ImgH, a center thickness CT7 of the seventh lens on the optical axis and an edge thickness ET7 of the seventh lens meet:

$TTL/ImgH \leq 1.25$; and $1.5 < CT7/ET7 < 2.5$.

In an implementation mode of the disclosure, the on-axis distance TTL from the object-side surface of the first lens to an image surface of the optical imaging lens assembly, the maximum half image height ImgH, an effective focal length f6 of the sixth lens and an effective focal length f9 of the ninth lens meet:

$4.8 \text{ mm} \leq ImgH^2/TTL \leq 6.0 \text{ mm}$; and $2.7 < f6/f9 < 3.2$.

In an implementation mode of the disclosure, an effective focal length f1 of the first lens, an effective focal length f of the optical imaging lens assembly, an air space T67 between the sixth lens and the seventh lens on the optical axis, an air space T78 between the seventh lens and the eighth lens on the optical axis and an air space T89 between the eighth lens and the ninth lens on the optical axis meet:

$1.8 < f1/f < 2.5$; and $0.9 < (T67+T78)/T89 < 1.4$.

In an implementation mode of the disclosure, the effective focal length f of the optical imaging lens assembly, the effective focal length f2 of the second lens, a curvature radius R15 of an object-side surface of the eighth lens, a curvature radius R16 of an image-side surface of the eighth lens, a curvature radius R13 of an object-side surface of the seventh lens and a curvature radius R14 of an image-side surface of the seventh lens meet:

$0 < f/f2 < 0.5$; and $-1.0 < (R15+R16)/(R13+R14) < -0.5$.

In an implementation mode of the disclosure, a maximum FOV of the optical imaging lens assembly, the effective semi-diameter DT22 of the image-side surface of the second lens and the edge thickness ET9 of the ninth lens meet:

$93° < FOV < 103°$; and $0.8 < DT22/ET9 < 1.3$.

The disclosure has the following positive effects. With adoption of the technical solutions provided in the disclosure, through a super-definition nine-element imaging lens group with an ultra-large image surface, the image quality may further be improved, an aberration may be controlled, and a good shooting effect may be achieved. In addition, each lens is compact in structure and relatively high in formability, and the system tolerance sensitivity is relatively low, so that the optical imaging lens assembly is relatively high in practicability.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
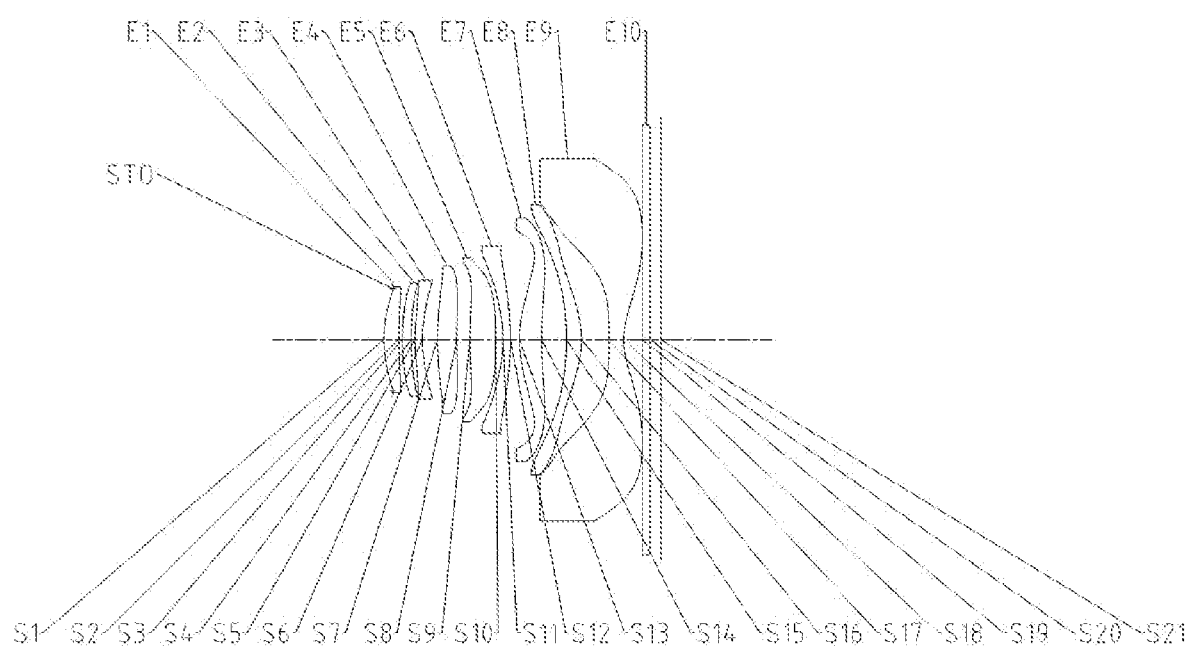
FIG. 1 shows a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or Aspheric shape shown in the drawings is shown by some embodiments. That is, the spherical shape or the Aspheric shape is not limited to the spherical shape or Aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include nine lenses. From an object side to an image side, the nine lenses are sequentially a first lens, a second lens, a third lens, a fourth lens, a fifth lens, a sixth lens, a seventh lens, an eighth lens and a ninth lens. The lenses are independent of one another and have air spaces on an optical axis.

In the embodiment of the disclosure, the first lens has positive refractive power; the second lens has positive refractive power, an object-side surface thereof is a convex surface, while an image-side surface is a concave surface; the third lens has refractive power, an object-side surface thereof is a convex surface, while an image-side surface is a concave surface; the fourth lens has refractive power; the fifth lens has refractive power; the sixth lens has refractive power; the seventh lens has positive refractive power; the eighth lens has refractive power; and the ninth lens has negative refractive power, an object-side surface thereof is a concave surface, while an image-side surface is a concave surface. The nine lenses are independent of one another and have the air spaces on the optical axis. The first and second lenses with the positive refractive power are favorable for converging incident light. The second and third lenses of which the object-side surfaces are convex surfaces and the image-side surfaces are concave surfaces are favorable for compressing a position of a diaphragm, reducing a pupil aberration and improving the imaging quality. The seventh lens with the positive refractive power is favorable for balancing astigmatism generated by front and rear components of a system. The ninth lens with the negative refractive power is favorable for improving an incidence angle of incidence of light to an image surface of the optical imaging lens assembly.

In the embodiment of the disclosure, the optical imaging lens assembly according to the disclosure may meet TTL/ImgH≤1.25, wherein TTL is an on-axis distance from an object-side surface of the first lens to the image surface, and ImgH is a maximum half image height. Controlling a ratio of the Total Track Length (TTL) of the system to an image height reasonably in a reasonable range is favorable for reducing the TTL of the system and achieving the characteristics of ultrathin design and small size. More specifically, TTL and ImgH may meet 1.095≤TTL/ImgH≤1.25, preferably 1.13≤TTL/ImgH≤1.20.

In the embodiment of the disclosure, the optical imaging lens assembly according to the disclosure may meet 4.8 mm≤ImgH$^2$/TTL≤6.0 mm, wherein TTL is the on-axis distance from an object-side surface of the first lens to the image surface, and ImgH is the maximum half image height. The range of the conditional expression is set reasonably to further enable the optical imaging lens assembly to acquire more scenery contents to enrich imaging information based on achievement of the ultrathin design and the small size. More specifically, ImgH$^2$ and TTL may meet 4.8 mm≤ImgH$^2$/TTL≤5.97 mm, preferably 4.9 mm≤ImgH$^2$/TTL≤5.58 mm.

In the embodiment of the disclosure, the optical imaging lens assembly according to the disclosure may meet 1.8<f1/f<2.5, wherein f1 is an effective focal length of the first lens, and f is an effective focal length of the optical imaging lens assembly. A ratio of the focal lengths of the first lens and the system may be controlled reasonably to reduce a deflection angle of light and improve the imaging quality of the optical imaging lens assembly. More specifically, f1 and f may meet 1.86≤f1/f≤2.37, preferably 1.96≤f1/f≤2.20.

In the embodiment of the disclosure, the optical imaging lens assembly according to the disclosure may meet 0<f/f2<0.5, wherein f is the effective focal length of the optical imaging lens assembly, and f2 is an effective focal length of the second lens. The conditional expression may be controlled reasonably in a certain range to restrict an on-axis spherical aberration that is generated in a reasonable interval and ensure the imaging quality in an on-axis FOV. More specifically, f and f2 may meet 0.055≤f/f2≤0.13, preferably 0.08≤f/f2≤0.13.

In the embodiment of the disclosure, the optical imaging lens assembly according to the disclosure may meet 93°<FOV<103°, wherein FOV is a maximum field of view of the optical imaging lens assembly. Controlling the FOV of the lens in a certain range is favorable for controlling the optical system to collect object information reasonably. More specifically, the maximum FOV of the optical imaging lens assembly may meet 93.5°≤FOV≤100.7°, preferably 95.2°≤FOV≤98.8°.

In the embodiment of the disclosure, the optical imaging lens assembly according to the disclosure may meet −1.0<(R15+R16)/(R13+R14)<−0.5, wherein R15 is a curvature radius of an object-side surface of the eighth lens, R16 is a curvature radius of an image-side surface of the eighth lens, R13 is a curvature radius of an object-side surface of the seventh lens, and R14 is a curvature radius of an image-side surface of the seventh lens. The ratio of the conditional expression is controlled reasonably to ensure that light arrives at the two lenses at relatively small incidence angles in a central FOV and reduce the Modulation Transfer Function (MTF) tolerance sensitivity in the central FOV. More specifically, R15, R16, R13 and R14 may meet $-0.96 \leq (R15+R16)/(R13+R14) \leq -0.53$, preferably $-0.86 \leq (R15+R16)/(R13+R14) \leq -0.62$.

In the embodiment of the disclosure, the optical imaging lens assembly according to the disclosure may meet $0.7<f5/(f7+f8)<1.2$, wherein f5 is an effective focal lens of the fifth lens, f7 is an effective focal length of the seventh lens, and f8 is an effective focal length of the eighth lens. The ratio of the conditional expression may be restricted in a reasonable range to reduce the thickness sensitivity of the lens effectively and correct a field curvature. More specifically, f5, f7 and f8 may meet $0.825 \leq f5/(f7+f8) \leq 0.91$, preferably $0.85 \leq f5/(f7+f8) \leq 0.91$.

In the embodiment of the disclosure, the optical imaging lens assembly according to the disclosure may meet $0.8<DT22/ET9<1.3$, wherein DT22 is an effective semi-diameter of the image-side surface of the second lens, and ET9 is an edge thickness of the ninth lens. Controlling the conditional expression in a proper range is helpful to reduce a segment gap between the front-end lenses and the assembling sensitivity and simultaneously reduce a size of a head of the system structure. More specifically, DT22 and ET9 may meet $0.92 \leq DT22/ET9 \leq 1.13$, and preferably $1.10 \leq DT22/ET9 \leq 1.13$.

In the embodiment of the disclosure, the optical imaging lens assembly according to the disclosure may meet $1.4<SAG61/SAG62<2.4$, wherein SAG61 is an on-axis distance from an intersection point of an object-side surface of the sixth lens and the optical axis to an effective radius vertex of the object-side surface of the sixth lens, and SAG62 is an on-axis distance from an intersection point of an image-side surface of the sixth lens and the optical axis to an effective radius vertex of the image-side surface of the sixth lens. Controlling the conditional expression reasonably in a certain range is favorable for reducing the sensitivity of the sixth lens and conveniently forming the lens, and is also favorable for balancing a relationship between implementation of module miniaturization and relative illumination in an off-axis FOV better. More specifically, SAG61 and SAG62 may meet $1.56 \leq SAG61/SAG62 \leq 2.27$, preferably $2.06 \leq SAG61/SAG62 \leq 2.27$.

In the embodiment of the disclosure, the optical imaging lens assembly according to the disclosure may meet $0.9<(T67+T78)/T89<1.4$, wherein T67 is the air space between the sixth lens and the seventh lens on the optical axis, T78 is the air space between the seventh lens and the eighth lens on the optical axis, and T89 is the air space between the eighth lens and the ninth lens on the optical axis. The ratio of the conditional expression may be controlled reasonably to ensure the field curvature of the optical imaging lens assembly effectively, thereby achieving high imaging quality in the off-axis FOV of the system. More specifically, T67, T78 and T89 may meet $1.03 \leq (T67+T78)/T89 \leq 1.24$, preferably $1.06 \leq (T67+T78)/T89 \leq 1.16$.

In the embodiment of the disclosure, the optical imaging lens assembly according to the disclosure may meet $2.7<f6/f9<3.2$, wherein f6 is an effective focal length of the sixth lens, and f9 is an effective focal length of the ninth lens. Configuring the refractive power of the sixth and ninth lenses reasonably is favorable for eliminating a chromatic aberration, reducing a secondary spectrum of the system and improving the imaging quality of the system. More specifically, f6 and f9 may meet $2.885 \leq f6/f9 \leq 3.03$.

In the embodiment of the disclosure, the optical imaging lens assembly according to the disclosure may meet $1.5<CT7/ET7<2.5$, wherein CT7 is a center thickness of the seventh lens on the optical axis, and ET7 is an edge thickness of the seventh lens. The ratio of the conditional expression may be restricted to control a distortion of the system reasonably and endow the optical system with high optical performance. More specifically, CT7 and ET7 may meet $1.67 \leq CT7/ET7 \leq 2.43$, preferably $2.12 \leq CT7/ET7 \leq 2.43$.

Each technical feature in the optical imaging lens assembly of the disclosure may be configured in a combined manner to achieve corresponding effects.

The optical imaging lens assembly according to the embodiment of the disclosure may adopt multiple lenses, for example, the abovementioned nine lenses. The refractive power and surface types of each lens, the center thickness of each lens, on-axis distances between the lenses and the like may be configured reasonably to make each lens compact in structure to achieve the ultrathin design and the small size, further enable the optical imaging lens assembly to acquire more scenery contents to enrich the imaging information on such a basis and simultaneously achieve relatively high formability and relatively low system tolerance sensitivity to make the optical imaging lens assembly relatively high in practicability. Through the optical imaging lens assembly as configured above, an electronic product may be endowed with the characteristics of, for example, high resolution, small size, wide angle and high imaging quality.

Specific embodiments applied to the optical imaging lens assembly of the abovementioned embodiment will further be described below with reference to the drawings.

Embodiment 1

FIG. 1 shows a structure diagram of an optical imaging lens assembly according to embodiment 1 of the disclosure. As shown in FIG. 1, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a concave surface. The fifth lens E5 has positive refractive power, an object-side surface S9 thereof is a convex surface, while an image-side surface S10 is a convex surface. The sixth lens has negative refractive power, an object-side surface S11 thereof is a concave surface, while an image-side surface 312 is a convex surface. The seventh lens has positive refractive power, an object-side surface S13 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface 317 thereof is a concave surface, while an image-side surface S18 is a concave surface. The optical filter E10 has an object-side surface S19 and an image-side surface 320. Light from an object sequentially penetrates through each of the surfaces S1 to S20 and is finally imaged on the imaging surface 321.

Table 1 is a basic parameter table of the optical imaging lens assembly of embodiment 1, and units of the curvature radius the thickness and the distance are all millimeter.

TABLE 1

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2400 | | | | |
| S1 | Aspheric | 3.5984 | 0.4004 | 9.96 | 1.54 | 56.1 | −5.7806 |
| S2 | Aspheric | 10.2827 | 0.1000 | | | | −74.3199 |
| S3 | Aspheric | 6.6409 | 0.2367 | 101.95 | 1.54 | 56.1 | −5.4769 |
| S4 | Aspheric | 7.4488 | 0.1000 | | | | 11.7024 |
| S5 | Aspheric | 4.6387 | 0.2000 | −20.24 | 1.64 | 23.3 | −14.7632 |
| S6 | Aspheric | 3.3575 | 0.4119 | | | | −6.1545 |
| S7 | Aspheric | 8.5421 | 0.5221 | 31.49 | 1.54 | 56.1 | −2.3474 |
| S8 | Aspheric | 16.6578 | 0.3515 | | | | −90.0000 |
| S9 | Aspheric | 8.6190 | 0.6993 | 11.65 | 1.54 | 56.1 | −22.9487 |
| S10 | Aspheric | −23.3455 | 0.2007 | | | | 74.3998 |
| S11 | Aspheric | −3.4061 | 0.2000 | −10.20 | 1.64 | 23.3 | −1.8833 |
| S12 | Aspheric | −7.2931 | 0.2424 | | | | −4.6056 |
| S13 | Aspheric | 3.2787 | 0.6045 | 7.51 | 1.54 | 56.1 | −0.4074 |
| S14 | Aspheric | 15.4747 | 0.6713 | | | | −89.2616 |
| S15 | Aspheric | −7.5205 | 0.4111 | 6.69 | 1.54 | 56.1 | 0.8456 |
| S16 | Aspheric | −2.5019 | 0.7356 | | | | −6.1165 |
| S17 | Aspheric | −35.0622 | 0.4000 | −3.36 | 1.54 | 55.7 | 88.9201 |
| S18 | Aspheric | 1.9045 | 0.5124 | | | | −5.3778 |
| S19 | Spherical | Infinite | 0.2000 | | 1.52 | 64.2 | |
| S20 | Spherical | Infinite | 0.3000 | | | | |
| S21 | Spherical | Infinite | | | | | |

In embodiment 1, a total effective focal length f of the optical imaging lens assembly is 5.36 mm, a TTL of the optical imaging lens assembly is 7.50 mm, and ImgH is a half of a length of an effective pixel region on the imaging surface S21 of the optical imaging lens assembly is 6.00 mm.

In embodiment 1, for an on-axis distance TTL from an object-side surface of the first lens to an image surface of the optical imaging lens assembly and a maximum half image height ImgH, TTL/ImgH=1.25, and a relational expression TTL/ImgH≤1.25 is met.

In embodiment 1, for the on-axis distance TTL from an object-side surface of the first lens to an image surface of the optical imaging lens assembly and the maximum half image height ImgH, ImgH$^2$/TTL=4.80 mm, and a relational expression 4.8 mm≤ImgH$^2$/TTL≤6.0 mm is met.

In embodiment 1, for an effective focal length f1 of the first lens and the effective focal length f of the optical imaging lens assembly, f1/f=1.86, and a relational expression 1.8<f1/f<2.5 is met.

In embodiment 1, for the effective focal length of the optical imaging lens assembly and an effective focal length f2 of the second lens, f/f2=0.05, and a relational expression 0<f/f2<0.5 is met.

In embodiment 1, for a maximum FOV of the optical imaging lens assembly, FOV=93.5°, and a relational expression 93°<FOV<103° is met.

In embodiment 1, for a curvature radius R15 of an object-side surface of the eighth lens, a curvature radius R16 of the image-side surface of the eighth lens, a curvature radius R13 of an object-side surface of the seventh lens and a curvature radius R14 of the image-side surface of the seventh lens, (R15+R16)/(R13+R14)=−0.53, and a relational expression −1.0<(R15+R16)/(R13+R14)<−0.5 is met.

In embodiment 1, for an effective focal length f5 of the fifth lens, an effective focal length f7 of the seventh lens and an effective focal length f8 of the eighth lens, f5/(f7+f8)=0.82, and a relational expression 0.7<f5/(f7+f8)<1.2 is met.

In embodiment 1, for an effective semi-diameter DT22 of the image-side surface of the second lens and an edge thickness ET9 of the ninth lens, DT22/ET9=1.02, and a relational expression 0.8<DT22/ET9<1.3 is met.

In embodiment 1, for SAG61 is an on-axis distance from an intersection point of an object-side surface of the sixth lens and the optical axis to an effective radius vertex of the object-side surface of the sixth lens, and SAG62 is an on-axis distance from an intersection point of the image-side surface of the sixth lens and the optical axis to an effective radius vertex of the image-side surface of the sixth lens, SAG61/SAG62=2.27, and a relational expression 1.4<SAG61/SAG62<2.4 is met.

In embodiment 1, for an air space T67 between the sixth lens and the seventh lens on the optical axis, an air space T78 between the seventh lens and the eighth lens on the optical axis and an air space T89 between the eighth lens and the ninth lens on the optical axis, (T67+T78)/T89=1.24, and a relational expression 0.9<(T67+T78)/T89<1.4 is met.

In embodiment 1, for an effective focal length f6 of the sixth lens and an effective focal length f9 of the ninth lens, f6/f9=3.03, and a relational expression 2.7<f6/f9<3.2 is met.

In embodiment 1, for a center thickness CT7 of the seventh lens on the optical axis and an edge thickness ET7 of the seventh lens, CT7/ET7=2.40, and a relational expression 1.5<CT7/ET7<2.5 is met.

In embodiment 1, both an object-side surface and image-side surface of any lens in the first lens E1 to the ninth lens E9 are Aspheric surfaces, and a surface type x of each Aspheric lens may be defined through, but not limited to, the following Aspheric surface formula:

$$x = \frac{ch^2}{1+\sqrt{1-(k+1)c^2h^2}} + \sum A_i h^i,$$

wherein x is a distance rise between a position of the Aspheric surface at a height h in a direction of the optical axis and an Aspheric surface vertex; c is a paraxial curvature of the Aspheric surface, c=1/R (namely, the paraxial curvature c is a reciprocal of the curvature radius R in Table 1); k is the cone coefficient (given in Table 1); and Ai is an ith-order correction coefficient of the Aspheric surface.

The Table 2 shows higher-order coefficients A4, A6, A8, A10, A12 and A14 applied to each of the Aspheric mirror surfaces S1-S18 of the Aspheric lenses in embodiment 1 of the disclosure.

TABLE 2

| Surface number | A4 | A6 | A8 | A10 | A12 | A14 |
|---|---|---|---|---|---|---|
| S1 | 1.1013E−02 | −2.3686E−03 | 1.2524E−03 | −1.8531E−03 | 9.2103E−04 | −1.9955E−04 |
| S2 | −6.8324E−03 | 2.6508E−03 | 1.7389E−03 | −4.1446E−03 | 2 2667E−03 | −4.6417E−04 |
| S3 | −1.4006E−03 | 7.4684E−03 | −4.9271E−03 | 7.3501E−04 | 1.3676E−03 | −4.1877E−04 |
| S4 | −2.0118E−03 | −8.4684E−04 | −6.3609E−03 | 2.0169E−03 | 1.9844E−03 | −6.4734E−04 |
| S5 | −2.4814E−02 | 8.8822E−03 | −1.4658E−02 | 9.8241E−03 | −2.1682E−03 | 8.1717E−05 |
| S6 | −1.8238E−02 | 1.2625E−02 | −1.1129E−02 | 7.8830E−03 | −2.5962E−03 | 3.0197E−04 |
| S7 | −5.6478E−03 | 2.5989E−03 | −1.2726E−03 | 4.0849E−04 | −9.3331E−05 | 8.6970E−06 |
| S8 | −1.3751E−02 | 3.5130E−03 | −1.5864E−03 | 2.4265E−04 | −7.7623E−07 | −6.6486E−06 |
| S9 | −1.6347E−02 | 4.6458E−04 | 8.7568E−04 | −7.7358E−04 | 1.8190E−04 | −1.4379E−05 |
| S10 | −3.0632E−02 | 1.1751E−02 | −6.2603E−03 | 1.5782E−03 | −2.2014E−04 | 1.4912E−05 |
| S11 | 2.8541E−02 | −8.5253E−03 | 4.8774E−04 | 1.4120E−04 | −1.4977E−05 | −1.6695E−07 |
| S12 | 1.7280E−02 | −1.1389E−02 | 4.1435E−03 | −8.8737E−04 | 1 0307E−04 | −4.7258E−06 |
| S13 | −2.0277E−02 | 8.1392E−04 | 2.3003E−04 | −8.4799E−05 | 8.4869E−06 | −3.6782E−07 |
| S14 | 1.0435E−02 | −6.4623E−03 | 1.5017E−03 | −2.1010E−04 | 1.5765E−05 | −4.8433E−07 |
| S15 | −3.4351E−03 | 4.7075E−05 | 8.8031E−05 | −1.3028E−05 | 7.8146E−07 | −1.5121E−08 |
| S16 | 2.0549E−04 | −3.3223E−04 | 4.6819E−04 | −9.2056E−05 | 6.7478E−06 | −1.7512E−07 |
| S17 | −3.2992E−02 | 1.3927E−03 | 2.2480E−04 | −2.7752E−05 | 1.6091E−06 | −4.5581E−08 |
| S18 | −1.8205E−02 | 2.6382E−03 | −2.4985E−04 | 1.4378E−05 | −4.6339E−07 | 6.1613E−09 |

Figure 2:
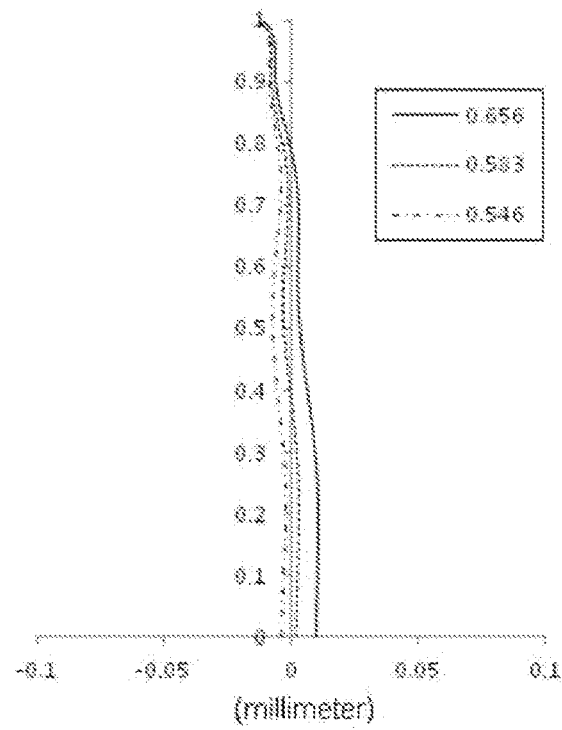
FIG. 2 to FIG. 5 show a longitudinal aberration curve, an astigmatism curve, a distortion curve and a lateral color curve of an optical imaging lens assembly according to embodiment 1 of the disclosure.
Figure 3:
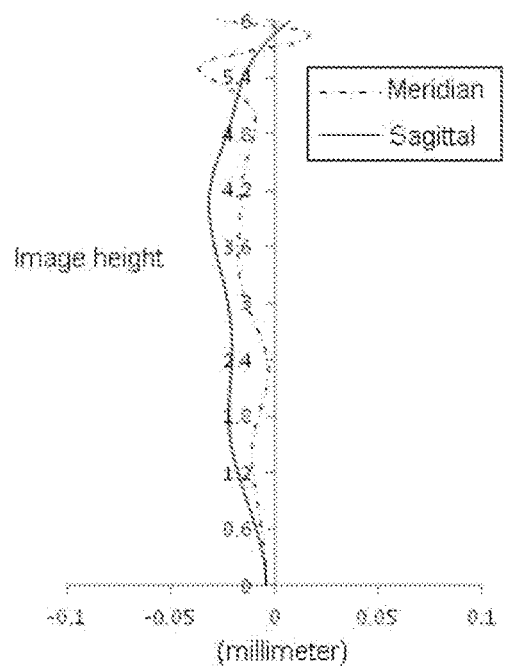
Figure 4:
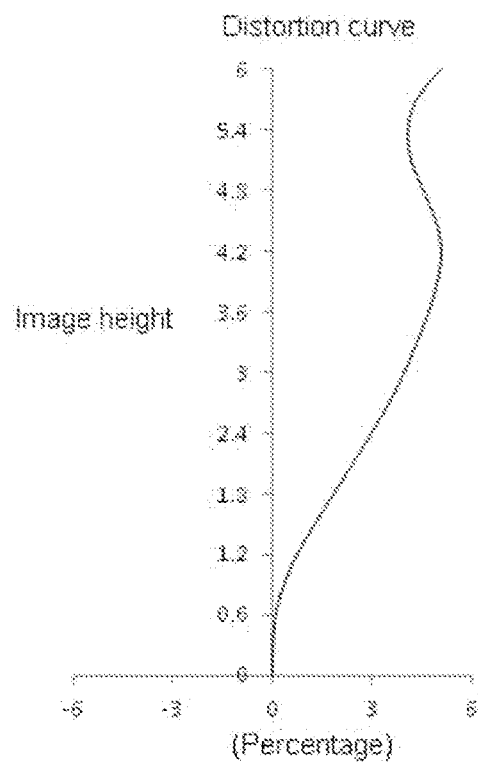
Figure 5:
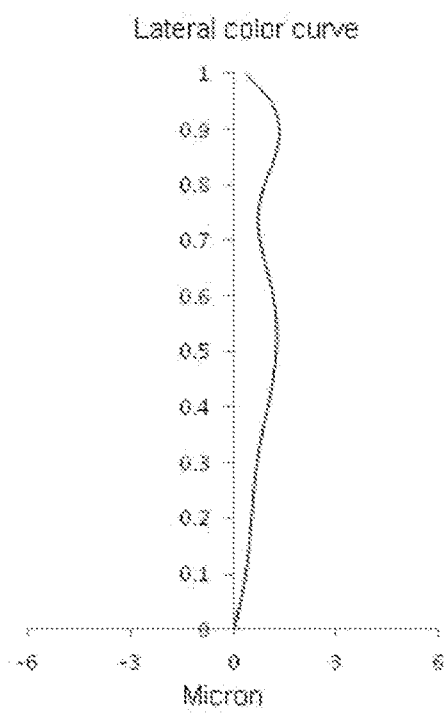

FIG. 2 shows a longitudinal aberration curve of the optical imaging lens assembly according to embodiment 1 to represent deviation of a convergence focal point after light with different wavelengths passes through the lens. FIG. 3 shows an astigmatism curve of the optical imaging lens assembly according to embodiment 1 to represent a meridian image surface of the optical imaging lens assembly curvature and a sagittal image surface curvature. FIG. 4 shows a distortion curve of the optical imaging lens assembly according to embodiment 2 to represent distortion values corresponding to different image heights. FIG. 5 shows a lateral color curve of the optical imaging lens assembly according to embodiment 2 to represent deviation of different image heights on the imaging surface after the light passes through the lens. According to FIG. 2 to FIG. 5, it can be seen that the optical imaging lens assembly provided in embodiment 1 may achieve high imaging quality.

Embodiment 2

Figure 6:
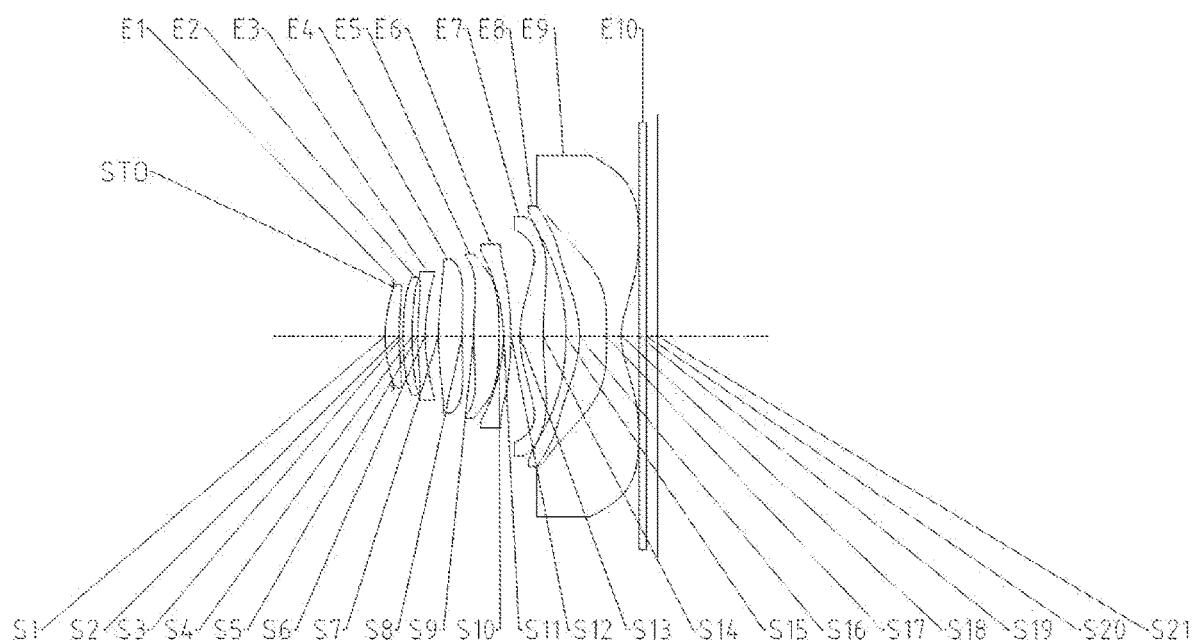
FIG. 6 shows a structure diagram of an optical imaging lens assembly according to embodiment 2 of the disclosure.

FIG. 6 shows a structure diagram of an optical imaging lens assembly according to embodiment 2 of the disclosure. As shown in FIG. 6, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface 321.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface 35 thereof is a convex surface, while an image-side surface S6 is a concave surface. The fourth lens E4 has positive refractive power, an object-side surface S7 thereof is a convex surface, while an image-side surface 38 is a concave surface. The fifth lens E5 has positive refractive power, an object-side surface S9 thereof is a convex surface, while an image-side surface S10 is a convex surface. The sixth lens has negative refractive power, an object-side surface S11 thereof is a concave surface, while an image-side surface S12 is a convex surface. The seventh lens has positive refractive power, an object-side surface S13 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface 317 thereof is a concave surface, while an image-side surface S18 is a concave surface. The optical filter E10 has an object-side surface 319 and an image-side surface 320. Light from an object sequentially penetrates through each of the surfaces 31 to S20 and is finally imaged on the imaging surface 321.

In embodiment 2 of the disclosure, explanations about parameters of each relational expression are the same as those in embodiment 1, and numerical values of each relational expression are listed in the Table 3.

TABLE 3

| Embodiment 2 | | | |
|---|---|---|---|
| f(mm) | 5.20 | TTL(mm) | 7.35 |
| ImgH(mm) | 6.00 | f1(mm) | −22.75 |
| TTL/ImgH | 1.22 | ImgH2/TTL(mm) | 4.90 |
| f1/f | 1.96 | f/f2 | 0.08 |
| FOV(°) | 95.2 | (R15 + R16)/(R13 + R14) | −0.62 |
| f5/(f7 + f8) | 0.85 | DT22/ET9 | 1.10 |
| SAG61/SAG62 | 2.22 | (T67 + T78)/T89 | 1.16 |
| f6/f9 | 2.98 | CT7/ET7 | 2.43 |

Table 4 shows a basic parameter table of the optical imaging lens assembly of embodiment 2 of the disclosure, and units of the curvature radius, the thickness and the distance are all millimeter.

TABLE 4

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2200 | | | | |
| S1 | Aspheric | 3.5377 | 0.3835 | 10.21 | 1.54 | 56.1 | −6.1912 |
| S2 | Aspheric | 9.3629 | 0.1000 | | | | −69.6663 |
| S3 | Aspheric | 6.9821 | 0.2452 | 68.06 | 1.54 | 56.1 | −7.0786 |
| S4 | Aspheric | 8.4969 | 0.1469 | | | | 11.1709 |
| S5 | Aspheric | 5.8262 | 0.2000 | −22.75 | 1.64 | 23.3 | −15.4735 |
| S6 | Aspheric | 4.1044 | 0.3631 | | | | −6.5658 |
| S7 | Aspheric | 8.8934 | 0.6342 | 32.22 | 1.54 | 56.1 | −5.4776 |
| S8 | Aspheric | 17.5904 | 0.3098 | | | | −80.7985 |
| S9 | Aspheric | 8.7106 | 0.6808 | 12.03 | 1.54 | 56.1 | −25.0105 |
| S10 | Aspheric | −25.6614 | 0.1256 | | | | 83.2607 |
| S11 | Aspheric | −3.2463 | 0.2000 | −10.04 | 1.64 | 23.3 | −1.6409 |
| S12 | Aspheric | −6.7272 | 0.2396 | | | | −3.9691 |
| S13 | Aspheric | 2.9956 | 0.6210 | 7.14 | 1.54 | 56.1 | −0.6747 |
| S14 | Aspheric | 12.1087 | 0.6121 | | | | −89.5190 |
| S15 | Aspheric | −6.8459 | 0.3764 | 6.97 | 1.54 | 56.1 | 0.9818 |
| S16 | Aspheric | −2.4887 | 0.7364 | | | | −5.9809 |
| S17 | Aspheric | −28.3157 | 0.4000 | −3.37 | 1.54 | 55.7 | 53.9324 |
| S18 | Aspheric | 1.9359 | 0.4753 | | | | −5.3090 |
| S19 | Spherical | Infinite | 0.2000 | | 1.52 | 64.2 | |
| S20 | Spherical | Infinite | 0.3000 | | | | |
| S21 | Spherical | Infinite | | | | | |

The Table 5 shows higher-order coefficients A4, A6, A8, A10, A12 and A14 applied to each of the Aspheric mirror surfaces S1-S18 of the Aspheric lenses in embodiment 2 of the disclosure.

TABLE 5

| Surface number | A4 | A6 | A8 | A10 | A12 | A14 |
|---|---|---|---|---|---|---|
| S1 | 1.2611E−02 | −3.9055E−03 | 1.2297E−03 | −1.3142E−03 | 5.9748E−04 | −1.5043E−04 |
| S2 | −1.1893E−03 | −8.7354E−03 | 1.1961E−02 | −8.7938E−03 | 3.2953E−03 | −5.6221E−04 |
| S3 | 2.4279E−03 | −1.0310E−02 | 1.6265E−02 | −1.1572E−02 | 5.1221E−03 | −8.9086E−04 |
| S4 | 1.5129E−03 | −1.8435E−02 | 1.6399E−02 | −1.1742E−02 | 6.1326E−03 | −1.1483E−03 |
| S5 | −2.2567E−02 | 7.3569E−04 | −6.9427E−03 | 6.6230E−03 | −1.6070E−03 | 4.9718E−05 |
| S6 | −1.7069E−02 | 9.0136E−03 | −8.9558E−03 | 7.3667E−03 | −2.5244E−03 | 2.9462E−04 |
| S7 | −6.6468E−03 | 3.4710E−03 | −2.2722E−03 | 9.1913E−04 | −2.0707E−04 | 1.7640E−05 |
| S8 | −1.4252E−02 | 1.7386E−03 | −1.7978E−04 | −4.4014E−04 | 1.6841E−04 | −2.3302E−05 |
| S9 | −1.4312E−02 | −3.3593E−03 | 3.7745E−03 | −1.9008E−03 | 3.9631E−04 | −3.0191E−05 |
| S10 | −3.7385E−02 | 1.5622E−02 | −7.9414E−03 | 1.9925E−03 | −2.7835E−04 | 1.9124E−05 |
| S11 | 3.0568E−02 | −8.6513E−03 | −5.9322E−04 | 6.6975E−04 | −1.1020E−04 | 5.7504E−06 |
| S12 | 2.1108E−02 | −1.5113E−02 | 5.4603E−03 | −1.1172E−03 | 1.2378E−04 | −5.4586E−06 |
| S13 | −2.3637E−02 | 1.2677E−03 | 1.4263E−04 | −7.7032E−05 | 7.1356E−06 | −2.8050E−07 |
| S14 | 1.3034E−02 | −8.6498E−03 | 2.1037E−03 | −3.1565E−04 | 2.6029E−05 | −8.7988E−07 |
| S15 | −4.1483E−03 | −6.6013E−05 | 1.7826E−04 | −3.2203E−05 | 2.5348E−06 | −7.1466E−08 |
| S16 | 1.7453E−03 | −1.5419E−03 | 9.5872E−04 | −1.8589E−04 | 1.4425E−05 | −3.9875E−07 |
| S17 | −3.1969E−02 | −2.3487E−03 | 1.5517E−03 | −2.2149E−04 | 1.4806E−05 | −3.9361E−07 |
| S18 | −1.9696E−02 | 2.6632E−03 | −2.1961E−04 | 1.0832E−05 | −3.0416E−07 | 3.5838E−09 |

Figure 7:
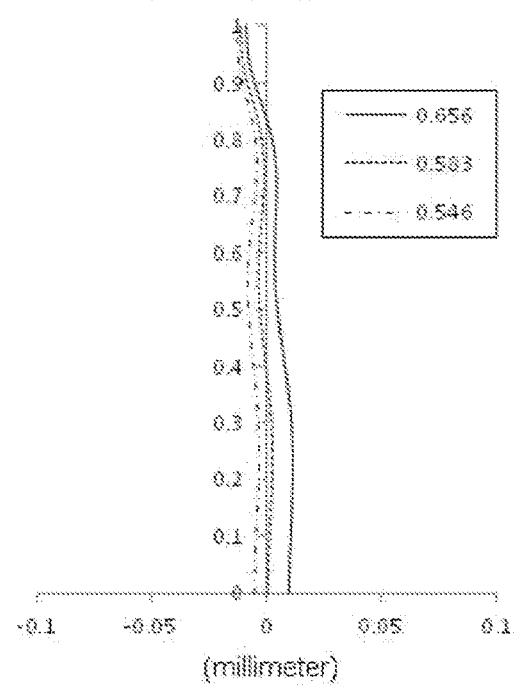
FIG. 7 to FIG. 10 show a longitudinal aberration curve, an astigmatism curve, a distortion curve and a lateral color curve of an optical imaging lens assembly according to embodiment 2 of the disclosure.
Figure 8:
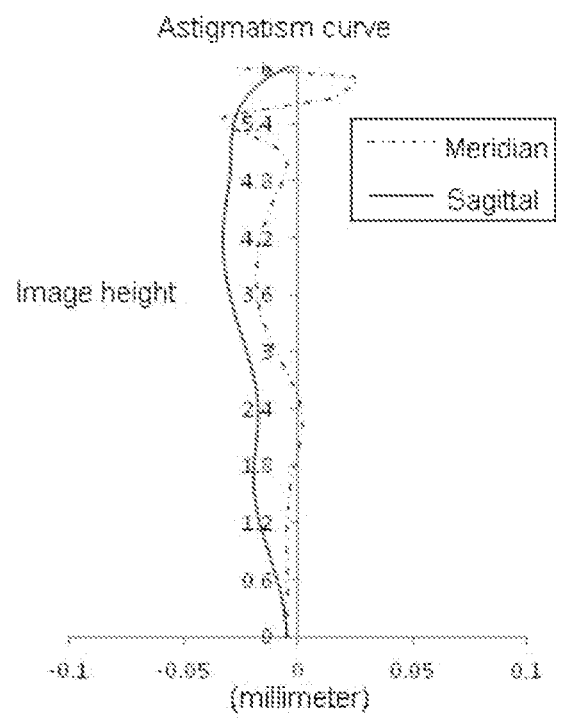
Figure 9:
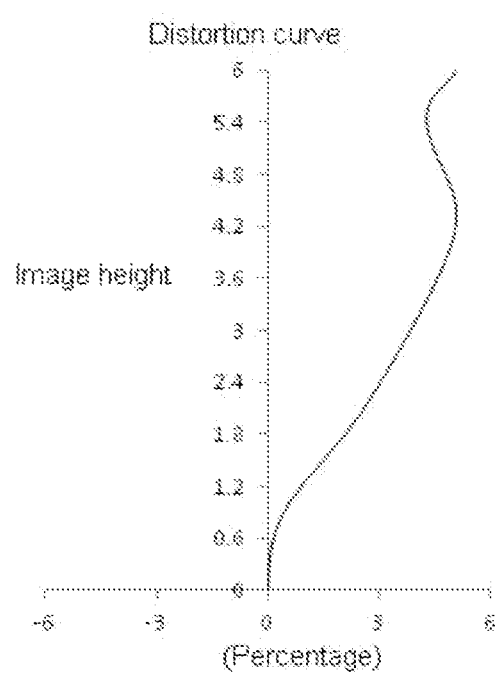
Figure 10:
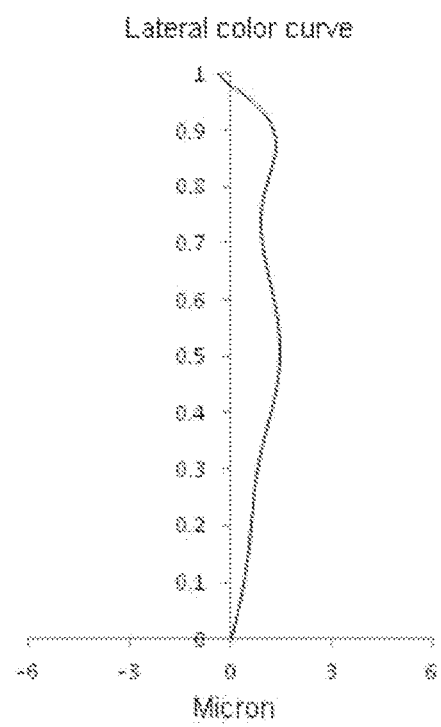

FIG. 7 shows a longitudinal aberration curve of the optical imaging lens assembly according to embodiment 2 of the disclosure to represent deviation of a convergence focal point after light with different wavelengths passes through the lens. FIG. 8 shows an astigmatism curve of the optical imaging lens assembly according to embodiment 2 of the disclosure to represent a meridian image surface curvature and a sagittal image surface curvature. FIG. 9 shows a distortion curve of the optical imaging lens assembly according to embodiment 2 of the disclosure to represent distortion values corresponding to different image heights. FIG. 10 shows a lateral color curve of the optical imaging lens assembly according to embodiment 2 of the disclosure to represent deviation of different image heights on the imaging surface after the light passes through the lens. According to FIG. 7 to FIG. 10, it can be seen that the optical imaging lens assembly provided in embodiment 2 of the disclosure may achieve high imaging quality.

Embodiment 3

Figure 11:
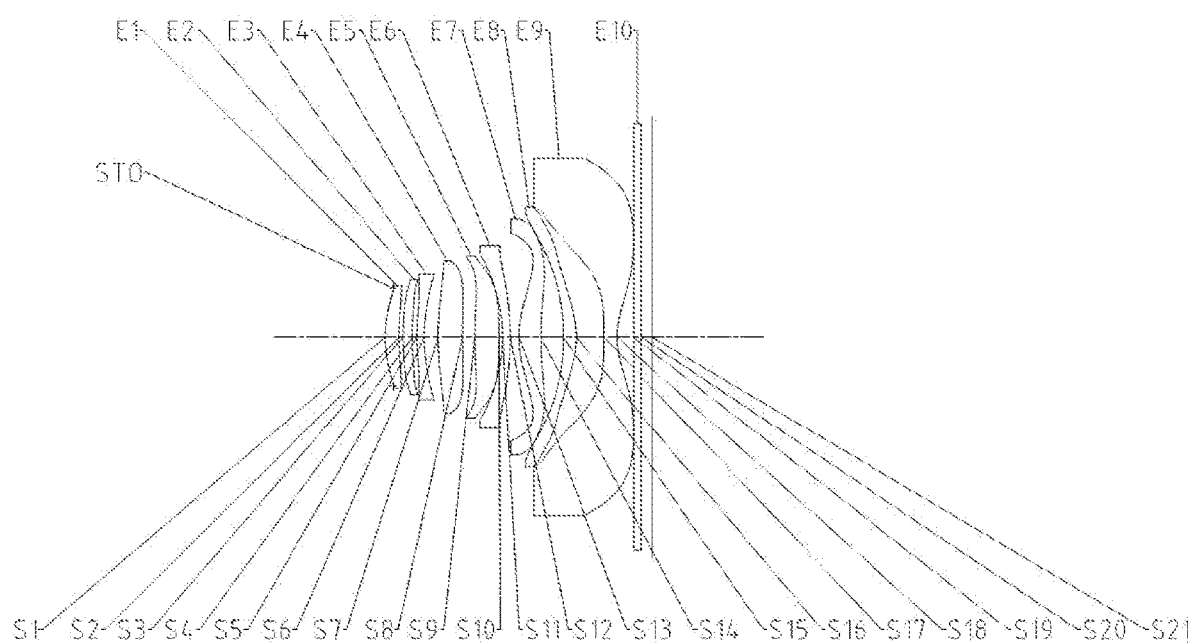
FIG. 11 shows a structure diagram of an optical imaging lens assembly according to embodiment 3 of the disclosure.

FIG. 11 shows a structure diagram of an optical imaging lens assembly according to embodiment 2 of the disclosure. As shown in FIG. 11, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface 321.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a concave surface. The fifth lens E5 has positive refractive power, an object-side surface S9 thereof is a convex surface, while an image-side surface S10 is a convex surface. The sixth lens has negative refractive power, an object-side surface S11 thereof is a concave surface, while an image-side surface S12 is a convex surface. The seventh lens has positive refractive power, an object-side surface 313 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface S17 thereof is a concave surface, while an image-side surface S18 is a concave surface. The optical filter E10 has an object-side surface S19 and an image-side surface 320. Light from an object sequentially penetrates through each of the surfaces S1 to S20 and is finally imaged on the imaging surface S21.

In embodiment 3 of the disclosure, explanations about parameters of each relational expression are the same as those in embodiment 1, and numerical values of each relational expression are listed in the Table 6.

TABLE 6

| Embodiment 3 | | | |
|---|---|---|---|
| f(mm) | 5.14 | TTL(mm) | 7.20 |
| ImgH(mm) | 6.00 | f1(mm) | 10.40 |
| TTL/ImgH | 1.20 | ImgH2/TTL(mm) | 5.00 |
| f1/f | 2.02 | f/f2 | 0.09 |
| FOV(°) | 96.0 | (R15 + R16)/(R13 + R14) | −0.73 |
| f5/(f7 + f8) | 0.86 | DT22/ET9 | 1.13 |
| SAG61/SAG62 | 2.18 | (T67 + T78)/T89 | 1.11 |
| f6/f9 | 2.93 | CT7/ET7 | 2.32 |

Table 7 shows a basic parameter table of the optical imaging lens assembly of embodiment 3 of the disclosure, and units of the curvature radius, the thickness and the distance are all millimeter.

TABLE 7

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2200 | | | | |
| S1 | Aspheric | 3.4377 | 0.3786 | 10.40 | 1.54 | 56.1 | −6.4466 |
| S2 | Aspheric | 8.4107 | 0.1000 | | | | −71.4140 |
| S3 | Aspheric | 7.3730 | 0.2532 | 56.66 | 1.54 | 56.1 | −8.2761 |
| S4 | Aspheric | 9.5719 | 0.1154 | | | | 10.6985 |
| S5 | Aspheric | 5.6774 | 0.2000 | −22.61 | 1.64 | 23.3 | −17.3402 |
| S6 | Aspheric | 4.0208 | 0.3758 | | | | −6.6504 |
| S7 | Aspheric | 7.9872 | 0.6569 | 27.92 | 1.54 | 56.1 | −6.6855 |
| S8 | Aspheric | 16.3434 | 0.3289 | | | | −90.0000 |
| S9 | Aspheric | 8.2151 | 0.6516 | 12.10 | 1.54 | 56.1 | −25.7367 |
| S10 | Aspheric | −32.2760 | 0.1000 | | | | 90.0000 |
| S11 | Aspheric | −3.2237 | 0.2000 | −9.72 | 1.64 | 23.3 | −1.5578 |
| S12 | Aspheric | −6.8594 | 0.2379 | | | | −3.3632 |
| S13 | Aspheric | 2.8110 | 0.5877 | 7.03 | 1.54 | 56.1 | −0.8327 |
| S14 | Aspheric | 9.8085 | 0.6029 | | | | −75.5688 |
| S15 | Aspheric | −6.7240 | 0.3507 | 7.04 | 1.54 | 56.1 | 0.9346 |
| S16 | Aspheric | −2.4860 | 0.7570 | | | | −6.4139 |
| S17 | Aspheric | −27.7391 | 0.3500 | −3.31 | 1.54 | 55.7 | 47.2073 |
| S18 | Aspheric | 1.9032 | 0.4534 | | | | −5.5496 |
| S19 | Spherical | Infinite | 0.2000 | | 1.52 | 64.2 | |
| S20 | Spherical | Infinite | 0.3000 | | | | |
| S21 | Spherical | Infinite | | | | | |

The Table 8 shows higher-order coefficients A4, A6, A8, A10, A12 and A14 applied to each of the Aspheric mirror surfaces S1-S18 of the Aspheric lenses in embodiment 3 of the disclosure.

TABLE 8

| Surface number | A4 | A6 | A8 | A10 | A12 | A14 |
|---|---|---|---|---|---|---|
| S1 | 1.4070E−02 | −4.3374E−03 | 9.4785E−04 | −1.6202E−03 | 9.3190E−04 | −2.4580E−04 |
| S2 | 3.4997E−04 | −8.2737E−03 | 6.2993E−03 | −2.7539E−03 | 7.5721E−04 | −2.0111E−04 |
| S3 | 1.0148E−03 | −6.8501E−03 | 7.9525E−03 | −3.1563E−03 | 1.6064E−03 | −3.7294E−03 |
| S4 | 1.4101E−03 | −1.4925E−02 | 7.3687E−03 | −4.0137E−03 | 3.3457E−03 | −7.7799E−04 |
| S5 | −2.3529E−02 | 3.3740E−03 | −1.1003E−02 | 8.6892E−03 | −1.9192E−03 | 3.8846E−05 |
| S6 | −1.9468E−02 | 1.2381E−02 | −1.1121E−02 | 8.0579E−03 | −2.5993E−03 | 2.9048E−04 |
| S7 | −7.1233E−03 | 2.7999E−03 | −1.3367E−03 | 4.6551E−04 | −1.0082E−04 | 7.6002E−06 |
| S8 | −1.4563E−02 | 2.1601E−03 | −9.8642E−04 | −7.7051E−05 | 9.7663E−05 | −1.8637E−05 |
| S9 | −1.4650E−02 | −3.1613E−03 | 3.9357E−03 | −2.1165E−03 | 4.5506E−04 | −3.5093E−05 |
| S10 | −3.9395E−02 | 1.4697E−02 | −7.2685E−03 | 1.8269E−03 | −2.6490E−04 | 1.9848E−05 |
| S11 | 3.6892E−02 | −1.4650E−02 | 2.0447E−03 | 3.3723E−05 | −2.9513E−05 | 1.4415E−06 |
| S12 | 2.2377E−02 | −1.6715E−02 | 6.3915E−03 | −1.4101E−03 | 1.6857E−04 | −8.0390E−06 |
| S13 | −2.7855E−02 | 2.8448E−03 | −3.4336E−04 | 1.2179E−05 | −2.9177E−06 | 1.7656E−07 |

TABLE 8-continued

| Surface number | A4 | A6 | A8 | A10 | A12 | A14 |
|---|---|---|---|---|---|---|
| S14 | 1.5290E−02 | −1.0452E−02 | 2.6446E−03 | −4.1507E−04 | 3.5924E−05 | −1.2685E−06 |
| S15 | −4.1612E−03 | −7.7518E−05 | 1.9032E−04 | −3.4759E−05 | 2.7748E−06 | −7.9753E−08 |
| S16 | 3.0780E−03 | −1.7190E−03 | 1.0290E−03 | −2.0812E−04 | 1.6779E−05 | −4.7824E−07 |
| S17 | −3.2764E−02 | −2.5028E−03 | 1.6046E−03 | −2.2723E−04 | 1.5278E−05 | −4.1308E−07 |
| S18 | −2.0309E−02 | 2.7704E−03 | −2.2897E−04 | 1.1234E−05 | −3.1568E−07 | 3.7792E−09 |

Figure 12:
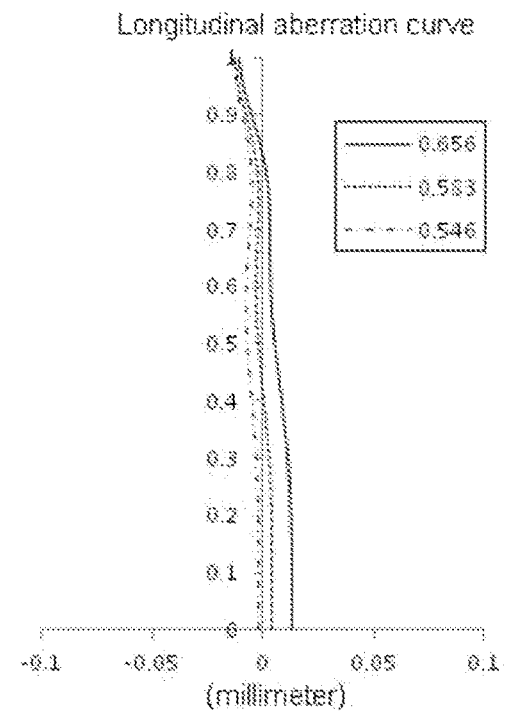
FIG. 12 to FIG. 15 show a longitudinal aberration curve, an astigmatism curve, a distortion curve and a lateral color curve of an optical imaging lens assembly according to embodiment 3 of the disclosure.
Figure 13:
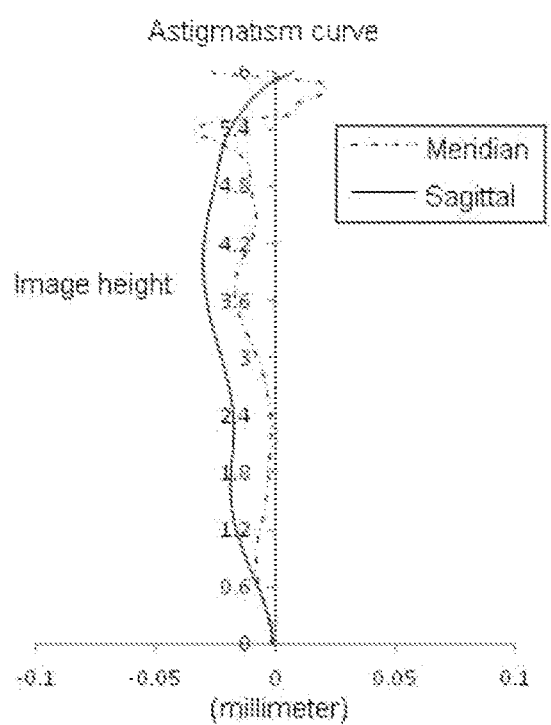
Figure 14:
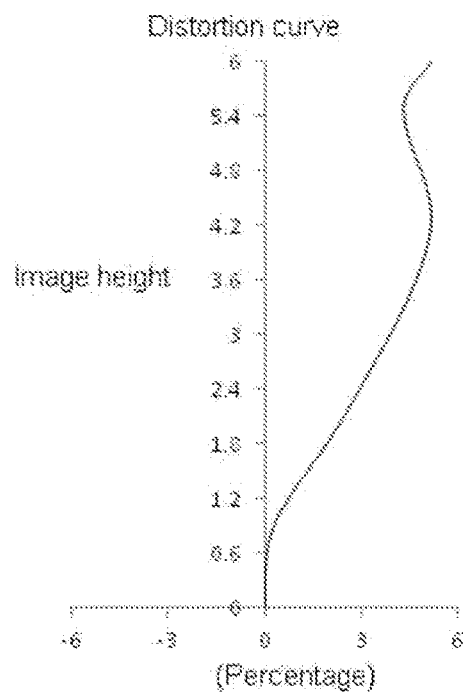
Figure 15:
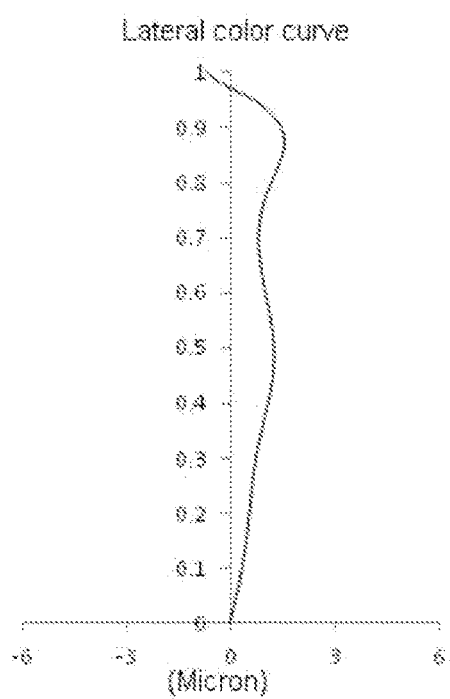

FIG. 12 shows a longitudinal aberration curve of the optical imaging lens assembly according to embodiment 3 of the disclosure to represent deviation of a convergence focal point after light with different wavelengths passes through the lens. FIG. 13 shows an astigmatism curve of the optical imaging lens assembly according to embodiment 3 of the disclosure to represent a meridian image surface curvature and a sagittal image surface curvature. FIG. 14 shows a distortion curve of the optical imaging lens assembly according to embodiment 3 of the disclosure to represent distortion values corresponding to different image heights. FIG. 15 shows a lateral color curve of the optical imaging lens assembly according to embodiment 3 of the disclosure to represent deviation of different image heights on the imaging surface after the light passes through the lens. According to FIG. 12 to FIG. 15, it can be seen that the optical imaging lens assembly provided in embodiment 3 of the disclosure may achieve high imaging quality.

Embodiment 4

Figure 16:
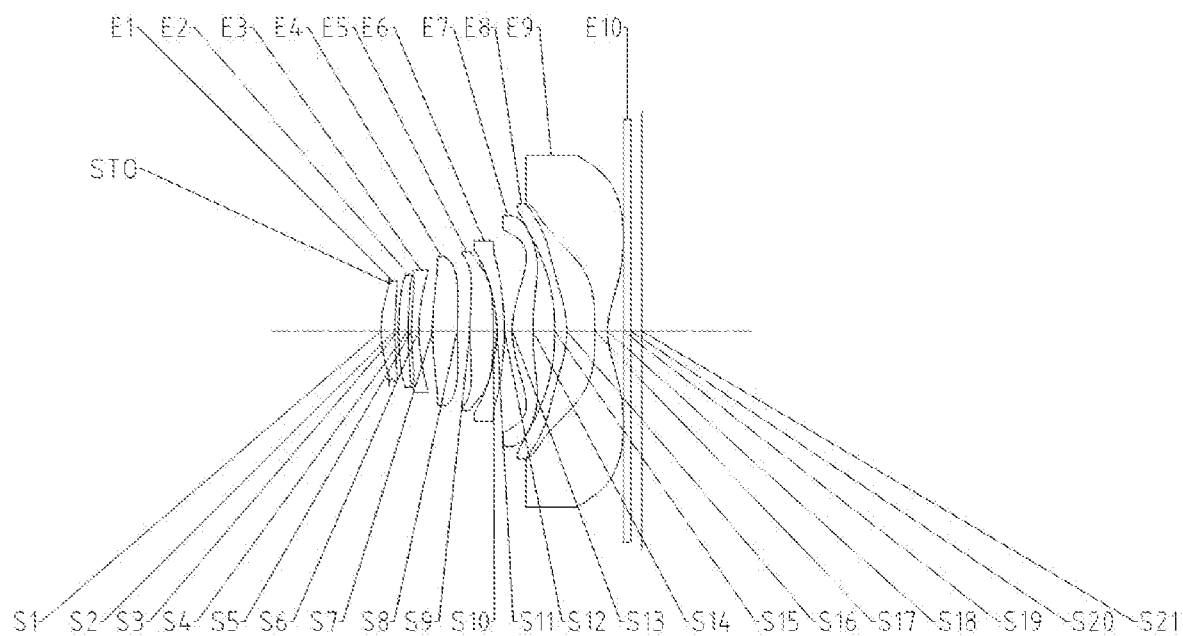
FIG. 16 shows a structure diagram of an optical imaging lens assembly according to embodiment 4 of the disclosure.

FIG. 16 shows a structure diagram of an optical imaging lens assembly according to embodiment 4 of the disclosure. As shown in FIG. 16, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface 321.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a concave surface. The fifth lens E5 has positive refractive power, an object-side surface S9 thereof is a convex surface, while an image-side surface S10 is a convex surface. The sixth lens has negative refractive power, an object-side surface S11 thereof is a concave surface, while an image-side surface S12 is a convex surface. The seventh lens has positive refractive power, an object-side surface 313 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface S17 thereof is a concave surface, while an image-side surface S18 is a concave surface. The optical filter E10 has an object-side surface S19 and an image-side surface 320. Light from an object sequentially penetrates through each of the surfaces S1 to S20 and is finally imaged on the imaging surface 321.

In embodiment 4 of the disclosure, explanations about parameters of each relational expression are the same as those in embodiment 1, and numerical values of each relational expression are listed in the Table 9.

TABLE 9

| Embodiment 4 | | | |
|---|---|---|---|
| f(mm) | 5.08 | TTL(mm) | 7.10 |
| ImgH(mm) | 6.00 | f1(mm) | 10.67 |
| TTL/ImgH | 1.18 | ImgH2/TTL(mm) | 5.07 |
| f1/f | 2.10 | f/f2 | 0.11 |
| FOV(°) | 96.6 | (R15 + R16)/(R13 + R14) | −0.81 |
| f5/(f7 + f8) | 0.88 | DT22/ET9 | 1.12 |
| SAG61/SAG62 | 2.08 | (T67 + T78)/T89 | 1.06 |
| f6/f9 | 2.88 | CT7/ET7 | 2.20 |

Table 10 shows a basic parameter table of the optical imaging lens assembly of embodiment 4 of the disclosure, and units of the curvature radius, the thickness and the distance are all millimeter.

TABLE 10

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2200 | | | | |
| S1 | Aspheric | 3.3810 | 0.3740 | 10.67 | 1.54 | 56.1 | −6.8180 |
| S2 | Aspheric | 7.7787 | 0.1000 | | | | −75.4401 |
| S3 | Aspheric | 7.7597 | 0.2610 | 45.50 | 1.54 | 56.1 | −9.9241 |
| S4 | Aspheric | 11.1659 | 0.0887 | | | | 10.8471 |
| S5 | Aspheric | 5.4686 | 0.2000 | −22.26 | 1.64 | 23.3 | −19 2751 |
| S6 | Aspheric | 3.8946 | 0.3762 | | | | −6.7546 |
| S7 | Aspheric | 7.9732 | 0.6705 | 24.45 | 1.54 | 56.1 | −6.9733 |
| S8 | Aspheric | 19.2913 | 0.3484 | | | | −90.0000 |
| S9 | Aspheric | 8.5498 | 0.6357 | 12.58 | 1.54 | 56.1 | −27.3530 |
| S10 | Aspheric | −33.4740 | 0.1000 | | | | 90.0000 |
| S11 | Aspheric | −3.1977 | 0.2000 | −9.62 | 1.64 | 23.3 | −1.4466 |

TABLE 10-continued

| Surface number | Surface type | Curvature radius | Thickness | Focal length | Refractive index | Abbe number | Conic coefficient |
|---|---|---|---|---|---|---|---|
| S12 | Aspheric | −6.8202 | 0.2172 | | | | −2.8493 |
| S13 | Aspheric | 2.6761 | 0.5666 | 6.91 | 1.54 | 56.1 | −0.9360 |
| S14 | Aspheric | 8.5883 | 0.5888 | | | | −60.3987 |
| S15 | Aspheric | −6.5820 | 0.3292 | 7.39 | 1.54 | 56.1 | 0.8602 |
| S16 | Aspheric | −2.5408 | 0.7593 | | | | −6.8346 |
| S17 | Aspheric | −27.1350 | 0.3500 | −3.34 | 1.54 | 55.7 | 43.8055 |
| S18 | Aspheric | 1.9225 | 0.4344 | | | | −5.6107 |
| S19 | Spherical | Infinite | 0.2000 | | 1.52 | 64.2 | |
| S20 | Spherical | Infinite | 0.3000 | | | | |
| S21 | Spherical | Infinite | | | | | |

The Table 11 shows higher-order coefficients A4, A6, A8, A10, A12 and A14 applied to each of the Aspheric mirror surfaces S1-S18 of the Aspheric lenses in embodiment 4 of the disclosure.

TABLE 11

| Surface number | A4 | A6 | A8 | A10 | A12 | A14 |
|---|---|---|---|---|---|---|
| S1 | 1.5722E−02 | −5.7808E−03 | 1.0371E−03 | −1.3893E−03 | 8.0429E−04 | −2.3812E−04 |
| S2 | 4.0365E−03 | −1.6673E−02 | 1.3085E−02 | −5.2146E−03 | 1.0520E−03 | −2.0543E−04 |
| S3 | 1.7199E−03 | −1.3537E−02 | 1.5828E−02 | −6.7378E−03 | 2.3212E−03 | −4.2796E−04 |
| S4 | 2.8662E−03 | −2.0397E−02 | 1.3435E−02 | −7.5796E−03 | 4.5799E−03 | −9.5866E−04 |
| S5 | −2.3916E−02 | 2.6524E−03 | −1.0759E−02 | 8.4060E−03 | −1.6175E−03 | −3.7121E−05 |
| S6 | −2.1388E−02 | 1.5326E−03 | −1.3433E−02 | 9.1345E−03 | −2.8621E−03 | 3.1440E−04 |
| S7 | −7.3435E−03 | 2.7367E−03 | −1.1032E−03 | 3.2515E−04 | −6.5138E−05 | 4.0223E−06 |
| S8 | −1.5401E−02 | 1.9688E−03 | −1.0726E−03 | −1.8355E−05 | 8.4217E−05 | −1.8389E−05 |
| S9 | −1.4349E−02 | −3.8272E−03 | 4.4097E−03 | −2.3310E−03 | 4.9472E−04 | −3.7464E−05 |
| S10 | −4.3510E−02 | 1.7838E−02 | −9.1967E−03 | 2.4807E−03 | −3.8138E−04 | 2.8943E−05 |
| S11 | 3.8716E−02 | −1.4659E−02 | 1.1259E−03 | 4.4782E−04 | −1.0015E−04 | 5.6520E−06 |
| S12 | 2.3903E−02 | −1.7686E−02 | 6.6077E−03 | −1.4412E−03 | 1.7273E−04 | −8.3423E−06 |
| S13 | −2.9854E−02 | 3.5802E−03 | −6.2444E−04 | 6.7380E−05 | −1.0037E−05 | 5.3524E−07 |
| S14 | 1.7578E−02 | −1.2214E−02 | 3.1532E−03 | −5.0678E−04 | 4.5038E−05 | −1.6316E−06 |
| S15 | −4.0673E−03 | −8.9200E−05 | 2.0011E−04 | −3.6818E−05 | 2.9662E−06 | −8.6422E−08 |
| S16 | 3.4439E−03 | −1.1246E−03 | 8.5582E−04 | −1.9748E−04 | 1.7179E−05 | −5.1643E−07 |
| S17 | −3.3794E−02 | −2.6167E−03 | 1.6603E−03 | −2.3296E−04 | 1.5675E−05 | −4.2951E−07 |
| S18 | −2.0825E−02 | 2.8131E−03 | −2.2814E−04 | 1.0900E−05 | −2.9835E−07 | 3.5130E−09 |

Figure 17:
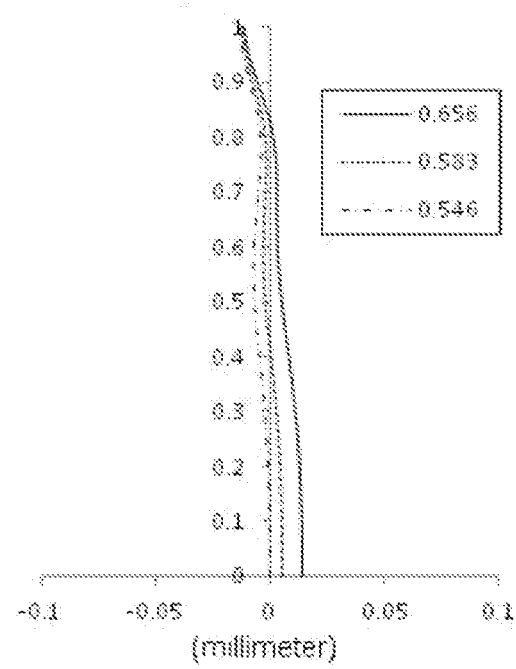
FIG. 17 to FIG. 20 show a longitudinal aberration curve, an astigmatism curve, a distortion curve and a lateral color curve of an optical imaging lens assembly according to embodiment 4 of the disclosure.
Figure 18:
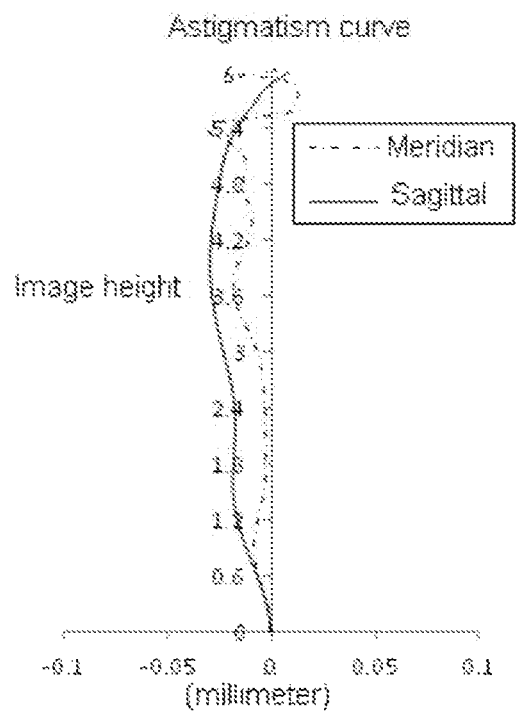
Figure 19:
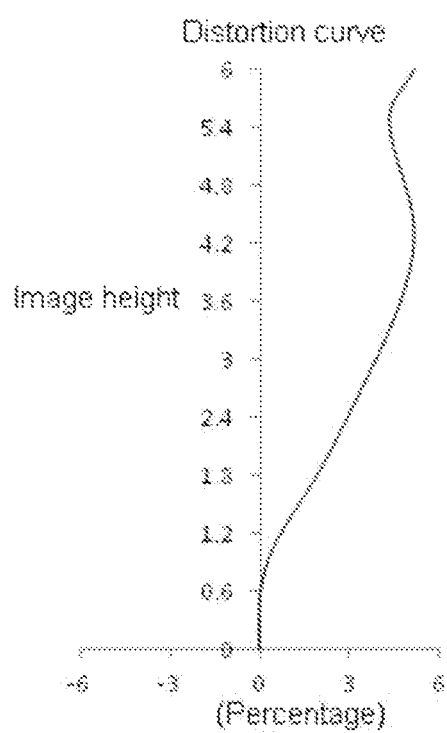
Figure 20:
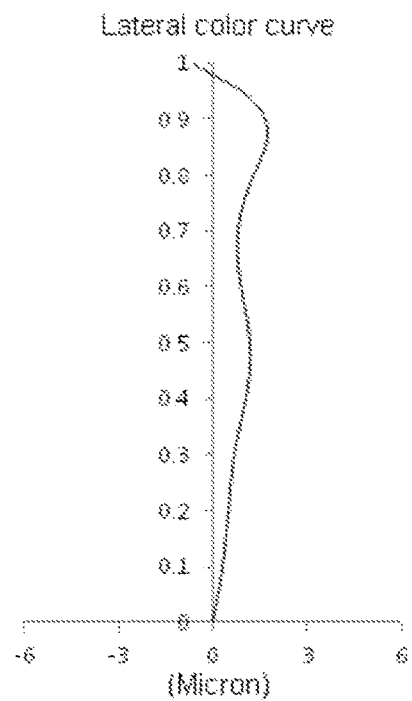

FIG. 17 shows a longitudinal aberration curve of the optical imaging lens assembly according to embodiment 4 of the disclosure to represent deviation of a convergence focal point after light with different wavelengths passes through the lens. FIG. 18 shows an astigmatism curve of the optical imaging lens assembly according to embodiment 4 of the disclosure to represent a meridian image surface curvature and a sagittal image surface curvature. FIG. 19 shows a distortion curve of the optical imaging lens assembly according to embodiment 4 of the disclosure to represent distortion values corresponding to different image heights. FIG. 20 shows a lateral color curie of the optical imaging lens assembly according to embodiment 4 of the disclosure to represent deviation of different image heights on the imaging surface after the light passes through the lens. According to FIG. 17 to FIG. 20, it can be seen that the optical imaging lens assembly provided in embodiment 4 of the disclosure may achieve high imaging quality.

Embodiment 5

Figure 21:
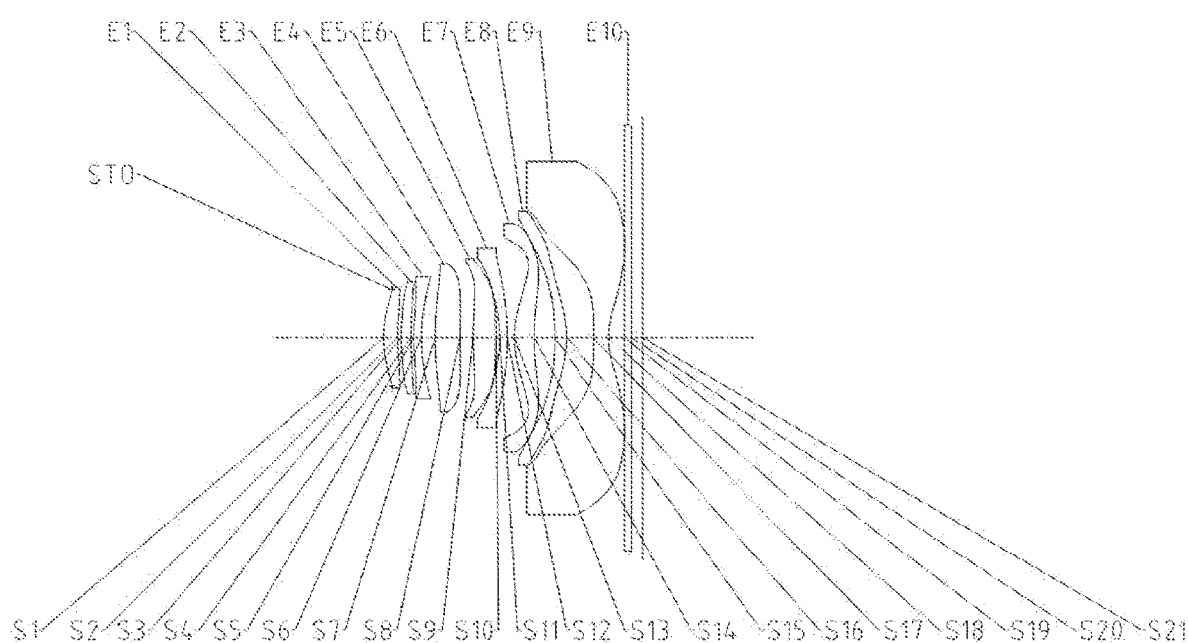
FIG. 21 shows a structure diagram of an optical imaging lens assembly according to embodiment 5 of the disclosure.

FIG. 21 shows a structure diagram of an optical imaging lens assembly according to embodiment 5 of the disclosure. As shown in FIG. 21, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a concave surface. The fifth lens E5 has positive refractive power, an object-side surface 39 thereof is a convex surface, while an image-side surface S10 is a convex surface. The sixth lens has negative refractive power, an object-side surface S11 thereof is a concave surface, while an image-side surface S12 is a convex surface. The seventh lens has positive refractive power, an object-side surface S13 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In embodiment 5 of the disclosure, explanations about parameters of each relational expression are the same as those in embodiment 1, and numerical values of each relational expression are listed in the Table 12.

TABLE 12

| Embodiment 5 | | | |
|---|---|---|---|
| f(mm) | 5.04 | TTL(mm) | 7.00 |
| ImgH(mm) | 6.00 | f1(mm) | 10.88 |
| TTL/ImgH | 1.17 | ImgH2/TTL(mm) | 5.14 |
| f1/f | 2.16 | f/f2 | 0.13 |

TABLE 12-continued

| Embodiment 5 | | | |
|---|---|---|---|
| FOV(°) | 97.1 | (R15 + R16)/(R13 + R14) | −0.86 |
| f5/(f7 + f8) | 0.91 | DT22/ET9 | 1.11 |
| SAG61/SAG62 | 2.06 | (T67 + T78)/T89 | 1.03 |
| f6/f9 | 2.88 | CT7/ET7 | 2.12 |

Table 13 shows basic parameters of the camera lens component of embodiment 5 of the disclosure, and units of the curvature radius, the thickness and the distance are all millimeter.

TABLE 13

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2200 | | | | |
| S1 | Aspheric | 3.3094 | 0.3711 | 10.88 | 1.54 | 56.1 | −7.1123 |
| S2 | Aspheric | 7.2072 | 0.1000 | | | | −77.9820 |
| S3 | Aspheric | 8.0421 | 0.2669 | 39.49 | 1.54 | 56.1 | −11.2456 |
| S4 | Aspheric | 12.6984 | 0.0684 | | | | 10.9657 |
| S5 | Aspheric | 5.2123 | 0.2000 | −22.91 | 1.64 | 23.3 | −20.4657 |
| S6 | Aspheric | 3.7867 | 0.3753 | | | | −6.8429 |
| S7 | Aspheric | 8.0577 | 0.6733 | 22.93 | 1.54 | 56.1 | −7.0519 |
| S8 | Aspheric | 22.0580 | 0.3527 | | | | −90.0000 |
| S9 | Aspheric | 8.7060 | 0.6144 | 13.26 | 1.54 | 56.1 | −28.5129 |
| S10 | Aspheric | −41.2259 | 0.1000 | | | | 90.0000 |
| S11 | Aspheric | −3.2233 | 0.2000 | −9.69 | 1.64 | 23.3 | −1.3769 |
| S12 | Aspheric | −6.8795 | 0.1954 | | | | −2.8273 |
| S13 | Aspheric | 2.5971 | 0.5353 | 6.81 | 1.54 | 56.1 | −1.0017 |
| S14 | Aspheric | 8.0339 | 0.5670 | | | | −55.2531 |
| S15 | Aspheric | −6.5126 | 0.3114 | 7.79 | 1.54 | 56.1 | 0.8230 |
| S16 | Aspheric | −2.6107 | 0.7433 | | | | −7.3358 |
| S17 | Aspheric | −27.1905 | 0.4000 | −3.36 | 1.54 | 55.7 | 36.3960 |
| S18 | Aspheric | 1.9363 | 0.4256 | | | | −5.6850 |
| S19 | Spherical | Infinite | 0.2000 | | 1.52 | 64.2 | |
| S20 | Spherical | Infinite | 0.3000 | | | | |
| S21 | Spherical | Infinite | | | | | |

The Table 14 shows higher-order coefficients A4, A6, A8, A10, A12 and A14 applied to each of the Aspheric mirror surfaces S1-S18 of the Aspheric lenses in embodiment 5 of the disclosure.

TABLE 14

| Surface number | A4 | A6 | A8 | A10 | A12 | A14 |
|---|---|---|---|---|---|---|
| S1 | 1.7464E−02 | −7.2449E−03 | 1.3839E−03 | −1.5399E−03 | 8.5544E−04 | −2.5471E−04 |
| S2 | 8.4791E−03 | −2.6056E−02 | 2.0570E−02 | −8.3891E−03 | 1.7804E−03 | −2.9539E−04 |
| S3 | 2.5543E−03 | −1.8990E−02 | 2.1342E−02 | −8.7196E−03 | 2.5750E−03 | −4.3570E−04 |
| S4 | 3.9471E−03 | −2.4587E−02 | 1.8619E−02 | −1.0977E−02 | 5.8172E−03 | −1.1430E−03 |
| S5 | −2.4343E−02 | 2.9749E−03 | −1.1348E−02 | 8.3233E−03 | −1.3177E−03 | −1.1591E−04 |
| S6 | −2.3342E−02 | 1.8916E−02 | −1.6754E−02 | 1.0805E−02 | −3.2733E−03 | 3.5144E−04 |
| S7 | −7.3983E−03 | 2.4475E−03 | −7.0894E−04 | 1.0635E−04 | −5.1062E−06 | −2.5173E−06 |
| S8 | −1.5932E−02 | 1.8673E−03 | −1.2385E−03 | 5.8781E−05 | 6.9721E−05 | −1.8275E−05 |
| S9 | −1.4565E−02 | −3.8259E−03 | 4.5686E−03 | −2.4502E−03 | 5.2022E−04 | −3.9132E−05 |
| S10 | −4.6280E−02 | 1.9266E−02 | −9.9041E−03 | 2.7209E−03 | −4.3603E−04 | 3.4974E−05 |
| S11 | 4.2124E−02 | −1.7258E−02 | 1.8908E−03 | 3.4585E−04 | −9.5023E−05 | 5.5112E−06 |
| S12 | 2.6217E−02 | −1.9871E−02 | 7.3607E−03 | −1.5677E−03 | 1.8433E−04 | −8.8550E−06 |
| S13 | −3.0702E−02 | 3.6775E−03 | −6.7449E−04 | 6.9597E−05 | −1.0774E−05 | 5.7977E−07 |
| S14 | 1.9232E−02 | −1.3792E−02 | 3.6574E−03 | −6.0332E−04 | 5.5219E−05 | −2.0653E−06 |
| S15 | −3.8944E−03 | −1.1059E−04 | 2.0732E−04 | −3.8551E−05 | 3.1408E−06 | −9.2446E−08 |
| S16 | 3.4810E−03 | −3.7421E−04 | 6.3130E−04 | −1.8033E−04 | 1.7363E−05 | −5.5902E−07 |
| S17 | −3.5141E−02 | −2.6904E−03 | 1.7356E−03 | −2.4311E−04 | 1.6453E−05 | −4.5991E−07 |
| S18 | −2.0717E−02 | 2.7319E−03 | −2.1393E−04 | 9.8535E−06 | −2.6376E−07 | 3.0855E−09 |

Figure 22:
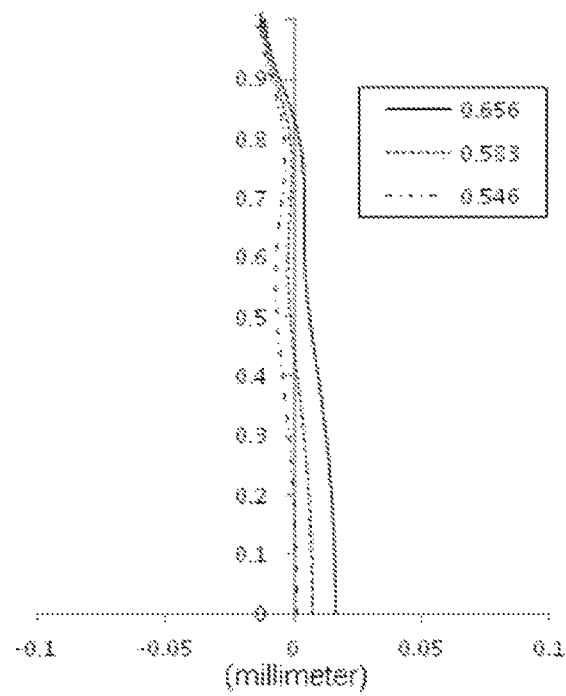
FIG. 22 to FIG. 25 show a longitudinal aberration curve, an astigmatism curve, a distortion curve and a lateral color curve of an optical imaging lens assembly according to embodiment 5 of the disclosure.
Figure 23:
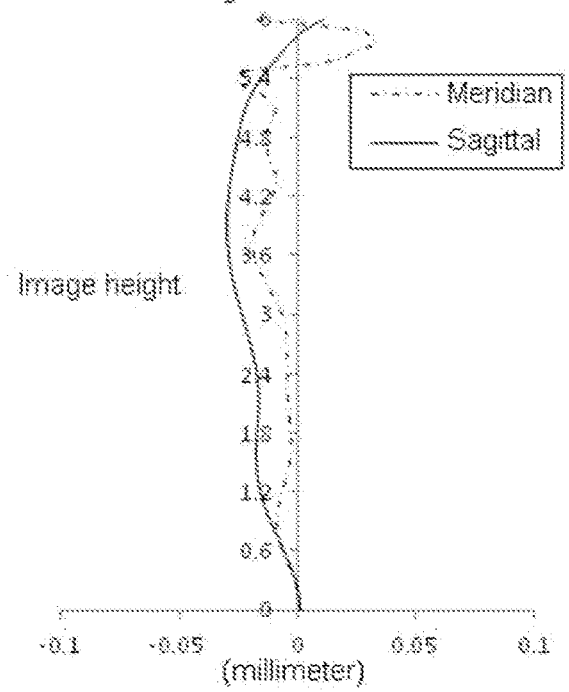
Figure 24:
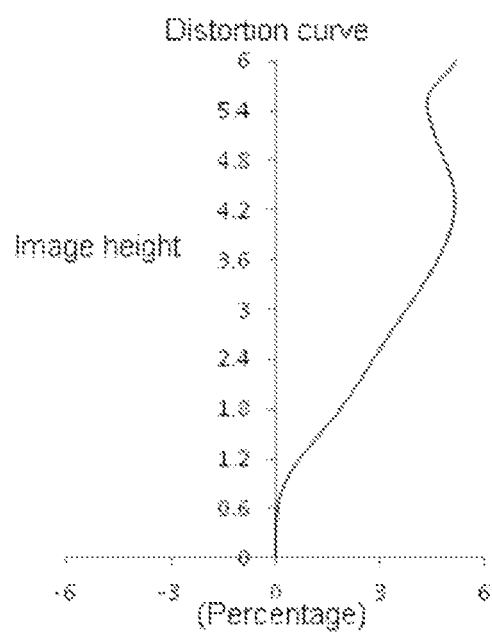
Figure 25:
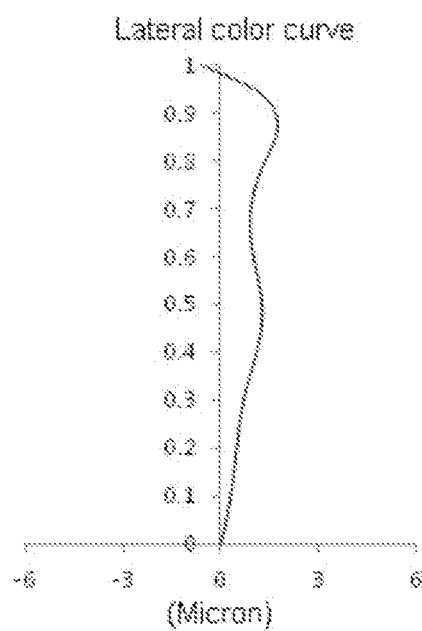

FIG. 22 shows a longitudinal aberration curve of the optical imaging lens assembly according to embodiment 5 of the disclosure to represent deviation of a convergence focal point after light with different wavelengths passes through the lens. FIG. 23 shows an astigmatism curve of the optical imaging lens assembly according to embodiment 5 of the disclosure to represent a meridian image surface of the optical imaging lens assembly curvature and a sagittal image surface curvature. FIG. 24 shows a distortion curve of the optical imaging lens assembly according to embodiment 5 of the disclosure to represent distortion values corresponding to different image heights. FIG. 25 shows a lateral color curve of the optical imaging lens assembly according to embodiment 5 of the disclosure to represent deviation of different image heights on the imaging surface after the light passes through the lens. According to FIG. 22 to FIG. 25, it can be seen that the optical imaging lens assembly provided in embodiment 5 of the disclosure may achieve high imaging quality.

Embodiment 6

Figure 26:
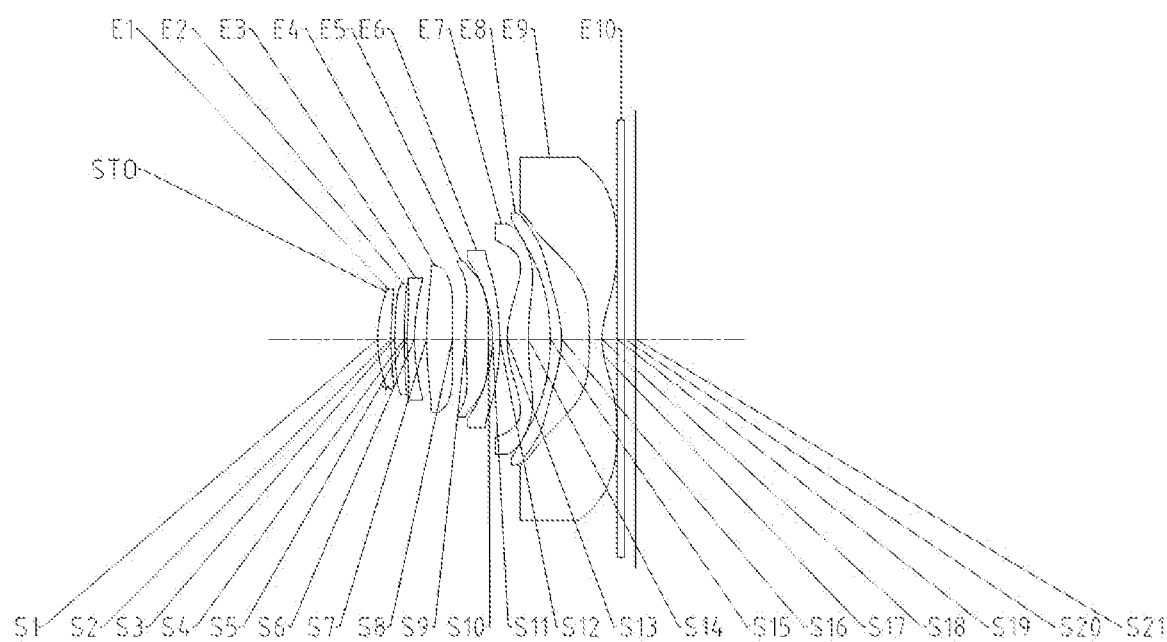
FIG. 26 shows a structure diagram of an optical imaging lens assembly according to embodiment 6 of the disclosure.

FIG. 26 shows a structure diagram of an optical imaging lens assembly according to embodiment 6 of the disclosure. As shown in FIG. 26, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface 321.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a concave surface. The fifth lens E5 has positive refractive power, an object-side surface S9 thereof is a convex surface, while an image-side surface S10 is a convex surface. The sixth lens has negative refractive power, an object-side surface S11 thereof is a concave surface, while an image-side surface S12 is a convex surface. The seventh lens has positive refractive power, an object-side surface 313 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface S17 thereof is a concave surface, while an image-side surface S18 is a concave surface. The optical filter E10 has an object-side surface S19 and an image-side surface 320. Light from an object sequentially penetrates through each of the surfaces S1 to S20 and is finally imaged on the imaging surface S21.

In embodiment 6 of the disclosure, explanations about parameters of each relational expression are the same as those in embodiment 1, and numerical values of each relational expression are listed in the Table 15.

TABLE 15

| Embodiment 6 | | | |
|---|---|---|---|
| f(mm) | 5.10 | TTL(mm) | 7.11 |
| ImgH(mm) | 6.30 | f1(mm) | 11.20 |
| TTL/ImgH | 1.13 | ImgH2/TTL(mm) | 5.58 |
| f1/f | 2.20 | f/f2 | 0.13 |
| FOV(°) | 98.8 | (R15 + R16)/(R13 + R14) | −0.80 |
| f5/(f7 + f8) | 0.91 | DT22/ET9 | 0.95 |
| SAG61/SAG62 | 1.72 | (T67 + T78)/T89 | 1.06 |
| f6/f9 | 2.89 | CT7/ET7 | 1.77 |

Table 16 shows a basic parameter table of the optical imaging lens assembly of embodiment 6 of the disclosure, and units of the curvature radius, the thickness and the distance are all millimeter.

TABLE 16

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2200 | | | | |
| S1 | Aspheric | 3.3757 | 0.3681 | 11.20 | 1.54 | 56.1 | −7.6041 |
| S2 | Aspheric | 7.2707 | 0.1000 | | | | −79.3450 |
| S3 | Aspheric | 9.2040 | 0.2679 | 38.96 | 1.54 | 56.1 | −14.9758 |
| S4 | Aspheric | 16.0951 | 0.0764 | | | | 17.4234 |
| S5 | Aspheric | 6.3262 | 0.2000 | −22.81 | 1.64 | 23.3 | −21.0792 |
| S6 | Aspheric | 4.3581 | 0.3374 | | | | −6.8600 |
| S7 | Aspheric | 8.7782 | 0.7179 | 20.80 | 1.54 | 56.1 | −7.6714 |
| S8 | Aspheric | 37.9530 | 0.3635 | | | | −90.0000 |
| S9 | Aspheric | 10.4078 | 0.6311 | 13.53 | 1.54 | 56.1 | −33.4473 |
| S10 | Aspheric | −24.6447 | 0.1030 | | | | 63.6277 |
| S11 | Aspheric | −2.9928 | 0.2000 | −9.64 | 1.64 | 23.3 | −1.1838 |
| S12 | Aspheric | −5.9703 | 0.2022 | | | | −1.4299 |
| S13 | Aspheric | 2.6038 | 0.5888 | 6.70 | 1.54 | 56.1 | −0.9986 |
| S14 | Aspheric | 8.3888 | 0.6025 | | | | −55.4816 |
| S15 | Aspheric | −6.1854 | 0.3149 | 8.17 | 1.54 | 56.1 | 0.8028 |
| S16 | Aspheric | −2.6334 | 0.7600 | | | | −7.3642 |
| S17 | Aspheric | −23.9282 | 0.3500 | −3.34 | 1.54 | 55.7 | 43.8001 |
| S18 | Aspheric | 1.9390 | 0.4264 | | | | −5.8410 |
| S19 | Spherical | Infinite | 0.2000 | | 1.52 | 64.2 | |
| S20 | Spherical | Infinite | 0.3000 | | | | |
| S21 | Spherical | Infinite | | | | | |

The Table 17 shows higher-order coefficients A4, A6, A8, A10, A12 and A14 applied to each of the Aspheric mirror surfaces S1-S18 of the Aspheric lenses in embodiment 6 of the disclosure.

TABLE 17

| Surface number | A4 | A6 | A8 | A10 | A12 | A14 |
| --- | --- | --- | --- | --- | --- | --- |
| S1 | 1.6962E−02 | −7.3464E−03 | 1.0978E−03 | −1.1879E−03 | 6.6945E−04 | −2.1253E−04 |
| S2 | 6.9737E−03 | −2.2989E−02 | 1.6424E−02 | −5.2623E−03 | 7.2448E−04 | −1.7197E−04 |
| S3 | −8.9424E−04 | −1.3302E−02 | 1.5123E−02 | −4.4415E−03 | 1.0817E−03 | −2.3988E−04 |
| S4 | 3.3186E−03 | −2.1490E−02 | 1.4684E−02 | −8.1177E−03 | 4.6290E−03 | −9.4110E−04 |
| S5 | −2.4729E−02 | 3.4775E−03 | −1.1686E−02 | 8.7005E−03 | −1.5830E−03 | −5.7160E−05 |
| S6 | −2.2572E−02 | 1.7086E−02 | −1.4634E−02 | 9.4547E−03 | −2.8463E−03 | 3.0005E−04 |
| S7 | −8.1008E−03 | 3.4082E−03 | −1.4380E−03 | 4.5470E−04 | −9.6978E−05 | 6.8724E−06 |
| S8 | −1.6165E−02 | 1.5055E−03 | −8.7030E−04 | −1.3367E−04 | 1.2240E−04 | −2.4251E−05 |
| S9 | −1.4544E−02 | −4.1359E−03 | 4.7661E−03 | −2.5538E−03 | 5.4450E−04 | −4.0998E−05 |
| S10 | −4.7729E−02 | 2.1917E−02 | −1.2120E−02 | 3.6273E−03 | −6.1254E−04 | 4.7998E−05 |
| S11 | 4.1106E−02 | −1.7508E−02 | 2.1881E−03 | 2.8383E−04 | −9.9938E−05 | 7.1815E−06 |
| S12 | 2.7132E−02 | −2.1683E−02 | 8.7683E−03 | −2.0459E−03 | 2.5445E−04 | −1.2586E−05 |
| S13 | −3.1992E−02 | 4.7506E−03 | −1.1710E−03 | 1.9113E−04 | −2.4947E−05 | 1.1783E−06 |
| S14 | 1.7493E−02 | −1.1956E−02 | 2.9165E−03 | −4.4066E−04 | 3.7057E−05 | −1.2816E−06 |
| S15 | −3.4488E−03 | 8.7345E−05 | 9.8126E−05 | −1.9929E−05 | 1.7206E−06 | −5.1318E−08 |
| S16 | 5.0075E−03 | −9.9573E−04 | 5.9102E−04 | −1.4901E−04 | 1.3670E−05 | −4.2328E−07 |
| S17 | −3.3378E−02 | −2.2411E−03 | 1.4296E−03 | −1.8733E−04 | 1.1718E−05 | −3.0146E−07 |
| S18 | −2.0465E−02 | 2.7576E−03 | −2.2241E−04 | 1.0575E−05 | −2.7942E−07 | 3.1093E−09 |

Figure 27:
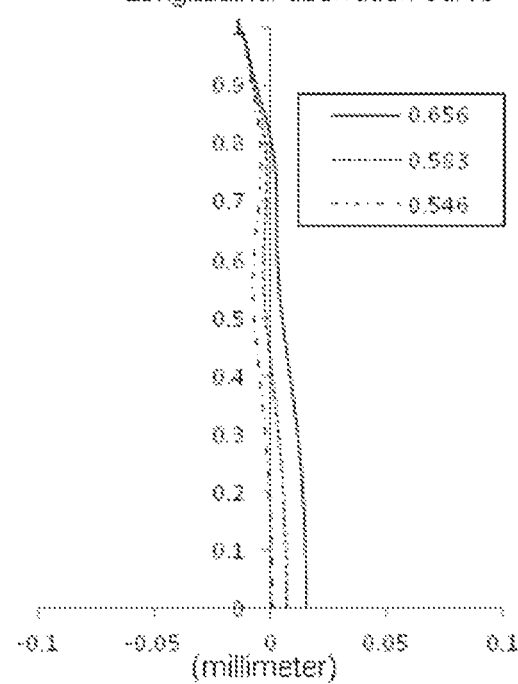
FIG. 27 to FIG. 30 show a longitudinal aberration curve, an astigmatism curve, a distortion curve and a lateral color curve of an optical imaging lens assembly according to embodiment 6 of the disclosure.
Figure 28:
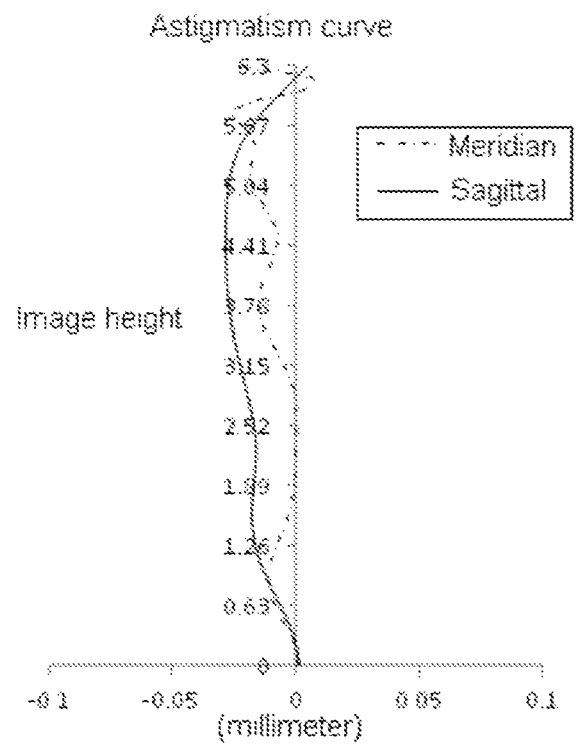
Figure 29:
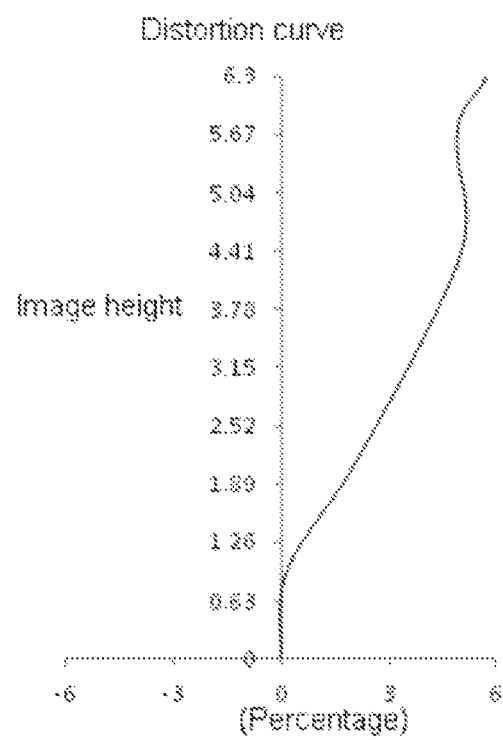
Figure 30:
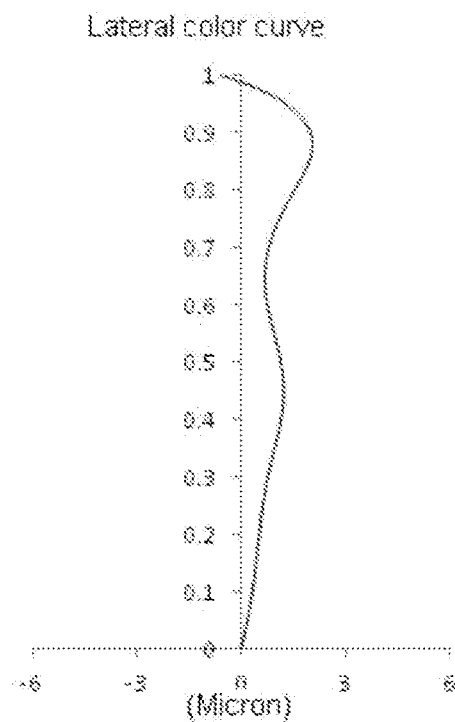

FIG. 27 shows a longitudinal aberration curve of the optical imaging lens assembly according to embodiment 6 of the disclosure to represent deviation of a convergence focal point after light with different wavelengths passes through the lens. FIG. 28 shows an astigmatism curve of the optical imaging lens assembly according to embodiment 6 of the disclosure to represent a meridian image surface curvature and a sagittal image surface curvature. FIG. 29 shows a distortion curve of the optical imaging lens assembly according to embodiment 6 of the disclosure to represent distortion values corresponding to different image heights. FIG. 30 shows a lateral color curie of the optical imaging lens assembly according to embodiment 6 of the disclosure to represent deviation of different image heights on the imaging surface after the light passes through the lens. According to FIG. 27 to FIG. 30, it can be seen that the optical imaging lens assembly provided in embodiment 6 of the disclosure may achieve high imaging quality.

Embodiment 7

Figure 31:
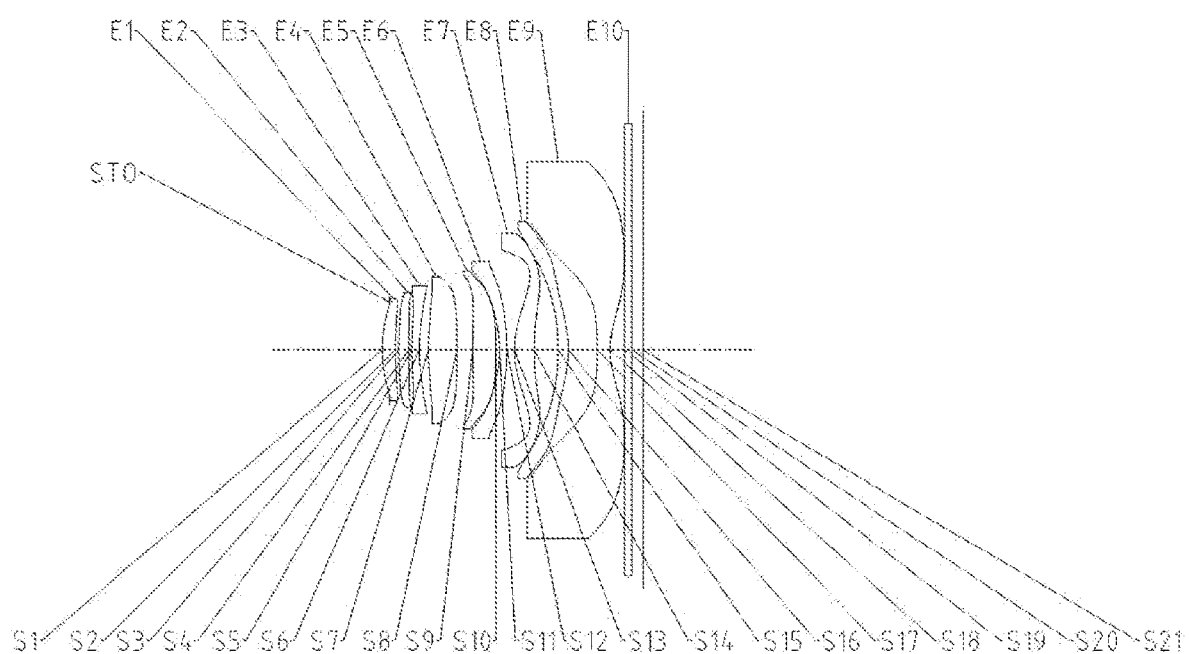
FIG. 31 shows a structure diagram of an optical imaging lens assembly according to embodiment 7 of the disclosure.

FIG. 31 shows a structure diagram of an optical imaging lens assembly according to embodiment 7 of the disclosure. As shown in FIG. 31, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a concave surface. The fifth lens E5 has positive refractive power, an object-side surface 39 thereof is a convex surface, while an image-side surface S10 is a convex surface. The sixth lens has negative refractive power, an object-side surface S11 thereof is a concave surface, while an image-side surface S12 is a convex surface. The seventh lens has positive refractive power, an object-side surface S13 thereof is a convex surface, while an image-side surface S14 is a convex surface. The eighth lens has positive refractive power, an object-side surface S15 thereof is a concave surface, while an image-side surface S16 is a convex surface. The ninth lens has negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In embodiment 7 of the disclosure, explanations about parameters of each relational expression are the same as those in embodiment 1, and numerical values of each relational expression are listed in the Table 18.

TABLE 18

| Embodiment 7 | | | |
| --- | --- | --- | --- |
| f(mm) | 5.07 | TTL(mm) | 7.08 |
| ImgH(mm) | 6.50 | f1(mm) | 12.02 |
| TTL/ImgH | 1.09 | ImgH2/TTL(mm) | 5.97 |
| f1/f | 2.37 | f/f2 | 0.13 |
| FOV(°) | 100.7 | (R15 + R16)/(R13 + R14) | −0.96 |
| f5/(f7 + f8) | 0.91 | DT22/ET9 | 0.92 |
| SAG61/SAG62 | 1.56 | (T67 + T78)/T89 | 1.07 |
| f6/f9 | 3.03 | CT7/ET7 | 1.67 |

Table 19 shows a basic parameter table of the optical imaging lens assembly of embodiment 7 of the disclosure, and units of the curvature radius, the thickness and the distance are all millimeter.

TABLE 19

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2000 | | | | |
| S1 | Aspheric | 3.4158 | 0.3514 | 12.02 | 1.54 | 56.1 | −9.1784 |
| S2 | Aspheric | 6.8894 | 0.1000 | | | | −83.5018 |
| S3 | Aspheric | 10.7758 | 0.2725 | 38.68 | 1.54 | 56.1 | −25.0944 |
| S4 | Aspheric | 21.8763 | 0.0785 | | | | 9.3106 |
| S5 | Aspheric | 7.2891 | 0.2000 | −23.51 | 1.64 | 23.3 | −20.9827 |
| S6 | Aspheric | 4.8564 | 0.2523 | | | | −7.4108 |
| S7 | Aspheric | 9.3127 | 0.7638 | 16.59 | 1.54 | 56.1 | −12.5036 |
| S8 | Aspheric | −288.2087 | 0.4332 | | | | 90.0000 |
| S9 | Aspheric | 12.7877 | 0.6284 | 15.10 | 1.54 | 56.1 | −47.9399 |
| S10 | Aspheric | −22.5933 | 0.1000 | | | | 71.7529 |
| S11 | Aspheric | −2.9667 | 0.2000 | −10.60 | 1.64 | 23.3 | −0.8615 |
| S12 | Aspheric | −5.4132 | 0.1977 | | | | −0.7921 |
| S13 | Aspheric | 2.4617 | 0.5354 | 6.79 | 1.54 | 56.1 | −0.9685 |
| S14 | Aspheric | 6.8061 | 0.6491 | | | | −35.6938 |
| S15 | Aspheric | −6.0340 | 0.2804 | 9.87 | 1.54 | 56.1 | 0.7499 |
| S16 | Aspheric | −2.8892 | 0.7894 | | | | −8.7909 |
| S17 | Aspheric | −23.9379 | 0.3500 | −3.50 | 1.54 | 55.7 | 38.8735 |
| S18 | Aspheric | 2.0457 | 0.3978 | | | | −6.1704 |
| S19 | Spherical | Infinite | 0.2000 | | 1.52 | 64.2 | |
| S20 | Spherical | Infinite | 0.3000 | | | | |
| S21 | Spherical | Infinite | | | | | |

The Table 20 shows higher-order coefficients A4, A6, A8, A10, A12 and A14 applied to each of the Aspheric mirror surfaces S1-S18 of the Aspheric lenses in embodiment 7 of the disclosure.

TABLE 20

| Surface number | A4 | A6 | A8 | A10 | A12 | A14 |
|---|---|---|---|---|---|---|
| S1 | 1.9076E−02 | −1.2176E−02 | 5.0709E−03 | −4.3737E−03 | 1.9752E−03 | −3.9907E−04 |
| S2 | 9.5297E−03 | −3.0640E−02 | 2.2784E−02 | −8.7920E−03 | 2.0836E−03 | −3.9452E−04 |
| S3 | −4.8242E−03 | −1.1013E−02 | 1.5208E−02 | −4.6169E−03 | 1.0419E−03 | −2.2539E−04 |
| S4 | 2.5149E−03 | −2.0444E−02 | 1.7127E−02 | −1.1136E−02 | 5.5144E−03 | −9.9479E−04 |
| S5 | −2.3336E−02 | 2.9828E−03 | −1.1593E−02 | 8.1990E−03 | −1.3358E−03 | −8.4485E−05 |
| S6 | −2.1626E−02 | 1.5937E−02 | −1.4584E−02 | 9.5822E−03 | −2.8419E−03 | 2.9250E−04 |
| S7 | −9.2227E−03 | 4.6954E−03 | −2.8298E−03 | 1.2618E−03 | −3.2017E−04 | 2.9378E−05 |
| S8 | −1.4809E−02 | −4.7670E−04 | −2.9553E−05 | −4.6809E−04 | 2.1261E−04 | −3.5951E−05 |
| S9 | −1.3095E−02 | −5.6905E−03 | 5.6626E−03 | −3.1191E−03 | 7.1671E−04 | −5.8124E−05 |
| S10 | −4.9976E−02 | 2.3230E−02 | −1.2839E−02 | 3.8678E−03 | −6.5741E−04 | 5.1789E−05 |
| S11 | 4.4098E−02 | −1.9209E−02 | 2.0400E−03 | 7.2216E−04 | −2.5826E−04 | 2.3699E−05 |
| S12 | 3.3136E−02 | −2.6236E−02 | 1.0720E−02 | −2.5506E−03 | 3.1488E−04 | −1.4999E−05 |
| S13 | −3.1408E−02 | 4.0648E−03 | −8.1829E−04 | 9.9921E−05 | −1.3268E−05 | 5.5195E−07 |
| S14 | 1.8306E−02 | −1.2451E−02 | 3.0326E−03 | −4.6173E−04 | 3.9230E−05 | −1.3642E−06 |
| S15 | −2.9995E−03 | 7.0327E−05 | 8.8220E−05 | −1.7207E−05 | 1.4457E−06 | −4.1900E−08 |
| S16 | 5.8861E−03 | −7.2011E−04 | 4.9486E−04 | −1.4010E−04 | 1.3223E−05 | −4.0963E−07 |
| S17 | −3.4732E−02 | −2.2156E−03 | 1.4578E−03 | −1.9050E−04 | 1.1918E−05 | −3.0890E−07 |
| S18 | −1.9514E−02 | 2.4287E−03 | −1.7635E−04 | 7.4729E−06 | −1.7533E−07 | 1.7480E−09 |

Figure 32:
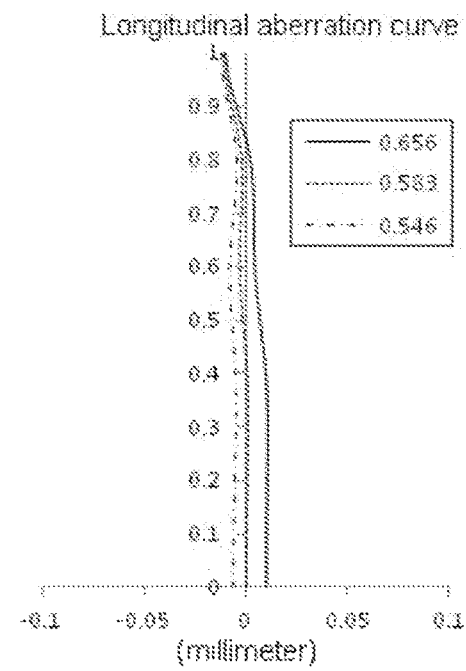
FIG. 32 to FIG. 35 show a longitudinal aberration curve, an astigmatism curve, a distortion curve and a lateral color curve of an optical imaging lens assembly according to embodiment 7 of the disclosure.
Figure 33:
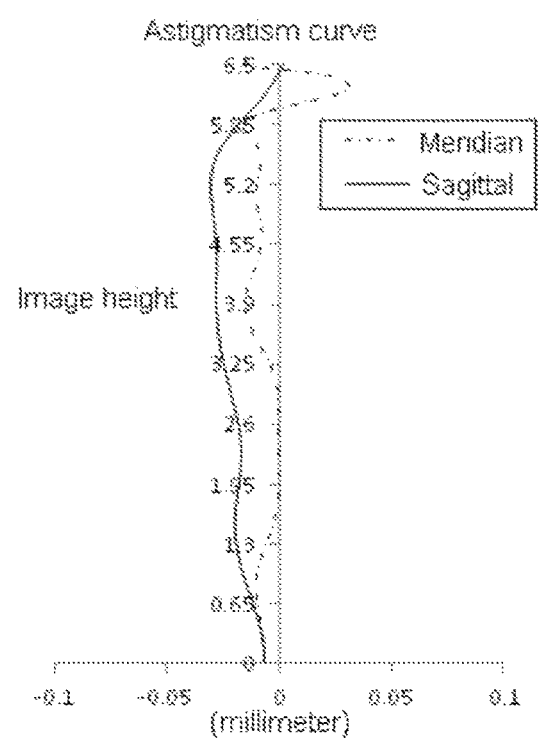
Figure 34:
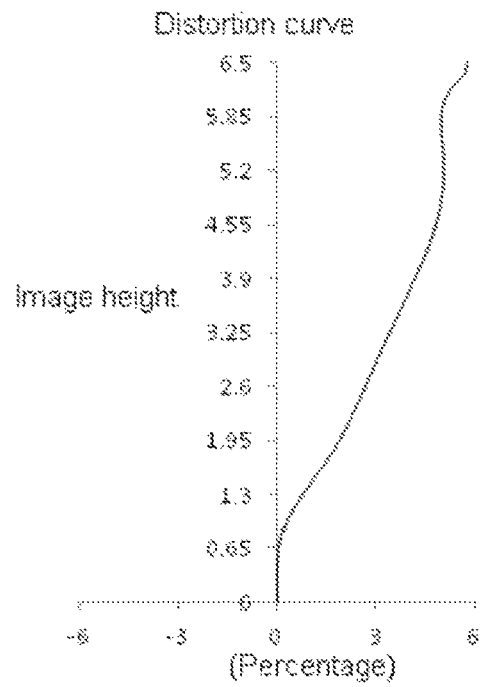
Figure 35:
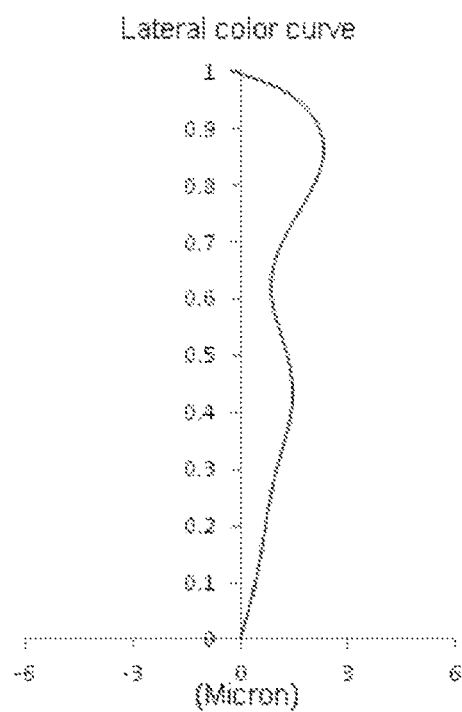

FIG. 32 shows a longitudinal aberration curve of the optical imaging lens assembly according to embodiment 7 of the disclosure to represent deviation of a convergence focal point after light with different wavelengths passes through the lens. FIG. 33 shows an astigmatism curve of the optical imaging lens assembly according to embodiment 7 of the disclosure to represent a meridian image surface curvature and a sagittal image surface curvature. FIG. 34 shows a distortion curve of the optical imaging lens assembly according to embodiment 7 of the disclosure to represent distortion values corresponding to different image heights. FIG. 35 shows a lateral color curve of the optical imaging lens assembly according to embodiment 7 of the disclosure to represent deviation of different image heights on the imaging surface after the light passes through the lens. According to FIG. 32 to FIG. 35, it can be seen that the optical imaging lens assembly provided in embodiment 7 of the disclosure may achieve high imaging quality.

To sum up, in embodiments 1 to 7 of the disclosure, each conditional expression meets the conditions in the Table 21.

TABLE 21

| Conditional expression | emobodiment | | | | | | |
|---|---|---|---|---|---|---|---|
| | 1 | 2 | 3 | 4 | 5 | 6 | 7 |
| TTL/ImgH | 1.25 | 1.22 | 1.20 | 1.18 | 1.17 | 1.13 | 1.09 |
| ImgH$^2$/TTL(mm) | 4.80 | 4.90 | 5.00 | 5.07 | 5.14 | 5.58 | 5.97 |
| f1/f | 1.86 | 1.96 | 2.02 | 2.10 | 2.16 | 2.20 | 2.37 |
| f/f2 | 0.05 | 0.08 | 0.09 | 0.11 | 0.13 | 0.13 | 0.13 |
| FOV(°) | 93.5 | 95.2 | 96.0 | 96.6 | 97.1 | 98.8 | 100.7 |
| (R15 + R16)/(R13 + R14) | −0.53 | −0.62 | −0.73 | −0.81 | −0.86 | −0.80 | −0.96 |
| f5/(f7 + f8) | 0.82 | 0.85 | 0.86 | 0.88 | 0.91 | 0.91 | 0.91 |
| DT22/ET9 | 1.02 | 1.10 | 1.13 | 1.12 | 1.11 | 0.95 | 0.92 |
| SAG61/SAG62 | 2.27 | 2.22 | 2.18 | 2.08 | 2.06 | 1.72 | 1.56 |
| (T67 + T78)/T89 | 1.24 | 1.16 | 1.11 | 1.06 | 1.03 | 1.06 | 1.07 |
| f6/f9 | 3.03 | 2.98 | 2.93 | 2.88 | 2.88 | 2.89 | 3.03 |
| CT7/ET7 | 2.40 | 2.43 | 2.32 | 2.20 | 2.12 | 1.77 | 1.67 |

The above description is only description about the preferred embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, comprising nine lenses, from an object side to an image side, the nine lenses are sequentially:
   a first lens with positive refractive power,
   a second lens with positive refractive power, of which an object-side surface thereof is a convex surface while an image-side surface is a concave surface,
   a third lens with refractive power, of which an object-side surface thereof is a convex surface while an image-side surface is a concave surface,
   a fourth lens with refractive power,
   a fifth lens with refractive power,
   a sixth lens with refractive power,
   a seventh lens with positive refractive power,
   an eighth lens with refractive power, and
   a ninth lens with negative refractive power, of which an object-side surface thereof is a concave surface while an image-side surface is a concave surface; and
   the nine lenses are independent of one another and have air spaces on an optical axis;
   SAG61 is an on-axis distance from an intersection point of an object-side surface of the sixth lens and the optical axis to an effective radius vertex of the object-side surface of the sixth lens, SAG62 is an on-axis distance from an intersection point of an image-side surface of the sixth lens and the optical axis to an effective radius vertex of the image-side surface of the sixth lens, SAG61 and SAG62 meet 1.4<SAG61/SAG62<2.4.

2. The optical imaging lens assembly according to claim 1, wherein an on-axis distance TTL from an object-side surface of the first lens to an image surface of the optical imaging lens assembly and a maximum half image height ImgH meet TTL/ImgH ≤1.25.

3. The optical imaging lens assembly according to claim 1, wherein the on-axis distance TTL from the object-side surface of the first lens to an image surface of the optical imaging lens assembly and a maximum half image height ImgH meet:

4.8 mm≤ImgH$^2$/$TTL$≤6.0 mm.

4. The optical imaging lens assembly according to claim 1, wherein an effective focal length f1 of the first lens and an effective focal length f of the optical imaging lens assembly meet 1.8<f1/f<2.5.

5. The optical imaging lens assembly according to claim 1, wherein an effective focal length f of the optical imaging lens assembly and an effective focal length f2 of the second lens meet 0<f/f2<0.5.

6. The optical imaging lens assembly according to claim 1, wherein a maximum field of view (FOV) of the optical imaging lens assembly meets 93°<FOV<103°.

7. The optical imaging lens assembly according to claim 1, wherein a curvature radius R15 of an object-side surface of the eighth lens, a curvature radius R16 of an image-side surface of the eighth lens, a curvature radius R13 of an object-side surface of the seventh lens and a curvature radius R14 of an image-side surface of the seventh lens meet:

-1.0<($R15+R16$)/($R13+R14$)<−0.5.

8. The optical imaging lens assembly according to claim 1, wherein an effective focal length f5 of the fifth lens, an effective focal length f7 of the seventh lens and an effective focal length f8 of the eighth lens meet:

0.7<$f5/(f7+f8)$<1.2.

9. The optical imaging lens assembly according to claim 1, wherein an effective semi-diameter DT22 of the image-side surface of the second lens and an edge thickness ET9 of the ninth lens meet:

0.8<$DT22/ET9$<1.3.

10. The optical imaging lens assembly according to claim 1, wherein an air space T67 between the sixth lens and the seventh lens on the optical axis, an air space T78 between the seventh lens and the eighth lens on the optical axis and an air space T89 between the eighth lens and the ninth lens on the optical axis meet 0.9<(T67+T78)/T89<1.4.

11. The optical imaging lens assembly according to claim 1, wherein an effective focal length f6 of the sixth lens and an effective focal length f9 of the ninth lens meet 2.7<f6/f9<3.2.

12. The optical imaging lens assembly according to claim 1, wherein a center thickness CT7 of the seventh lens on the optical axis and an edge thickness ET7 of the seventh lens meet 1.5<CT7/ET7<2.5.

* * * * *